United States Patent
Miyazaki et al.

(10) Patent No.: US 8,417,964 B2
(45) Date of Patent: Apr. 9, 2013

(54) SOFTWARE MODULE MANAGEMENT DEVICE AND PROGRAM

(75) Inventors: Shingo Miyazaki, Fuchu (JP); Fumihiko Sano, Kawasaki (JP); Koji Okada, Tokyo (JP); Shigeyuki Fukushima, Fuchu (JP); Chiaki Ishikawa, Tokyo (JP); Noboru Koshizuka, Tokyo (JP); Ken Sakamura, Tokyo (JP)

(73) Assignees: Toshiba Solutions Corporation, Tokyo (JP); Yokosuka Telecom Research Park, Inc., Yokosuka-shi (JP)

( * ) Notice: Subject to any disclaimer, the term of this patent is extended or adjusted under 35 U.S.C. 154(b) by 1165 days.

(21) Appl. No.: 12/212,933

(22) Filed: Sep. 18, 2008

(65) Prior Publication Data

US 2009/0138699 A1     May 28, 2009

(30) Foreign Application Priority Data

Sep. 28, 2007    (JP) ................................ 2007-255964

(51) Int. Cl.
    *G06F 11/30*        (2006.01)
    *G06F 12/14*        (2006.01)
(52) U.S. Cl. ..................................................... 713/189
(58) Field of Classification Search .................... 713/189
See application file for complete search history.

(56) References Cited

U.S. PATENT DOCUMENTS 7,096,357 B1 *    8/2006    Tochikubo et al. ........... 713/164

FOREIGN PATENT DOCUMENTS

| JP | 1-212041 | 8/1989 |
|---|---|---|
| JP | 2000-278260 | 10/2000 |
| JP | 2004-187090 | 7/2004 |
| JP | 2004-254286 | 9/2004 |
| JP | 2005-117232 | 4/2005 |
| JP | 2006-94244 | 4/2006 |
| JP | 2006-339847 | 12/2006 |

OTHER PUBLICATIONS

Yukiyo Akisada, "Incorrect Key Usage in AES-XCBC-MAC", http://home.jp.freebsd.org/cgi-bin/showmail/announce-jp/1319, 2005, pp. 1-4.
Office Action issued Jan. 10, 2012, in Japanese Patent Application No. 2007-255964 with English translation.

* cited by examiner

*Primary Examiner* — Kambiz Zand
*Assistant Examiner* — Stephen Sanders
(74) *Attorney, Agent, or Firm* — Oblon, Spivak, McClelland, Maier & Neustadt, L.L.P.

(57) ABSTRACT

A cryptographic client device acquires a cryptographic key from a storage device son the basis of the accepted demand information, acquires a cryptographic evaluation description file from the storage device, acquires a cryptographic module corresponding to this cryptographic evaluation description file, executes a cryptographic process on the subject data to be performed the cryptographic process, and issues the encrypted subject data.

20 Claims, 32 Drawing Sheets

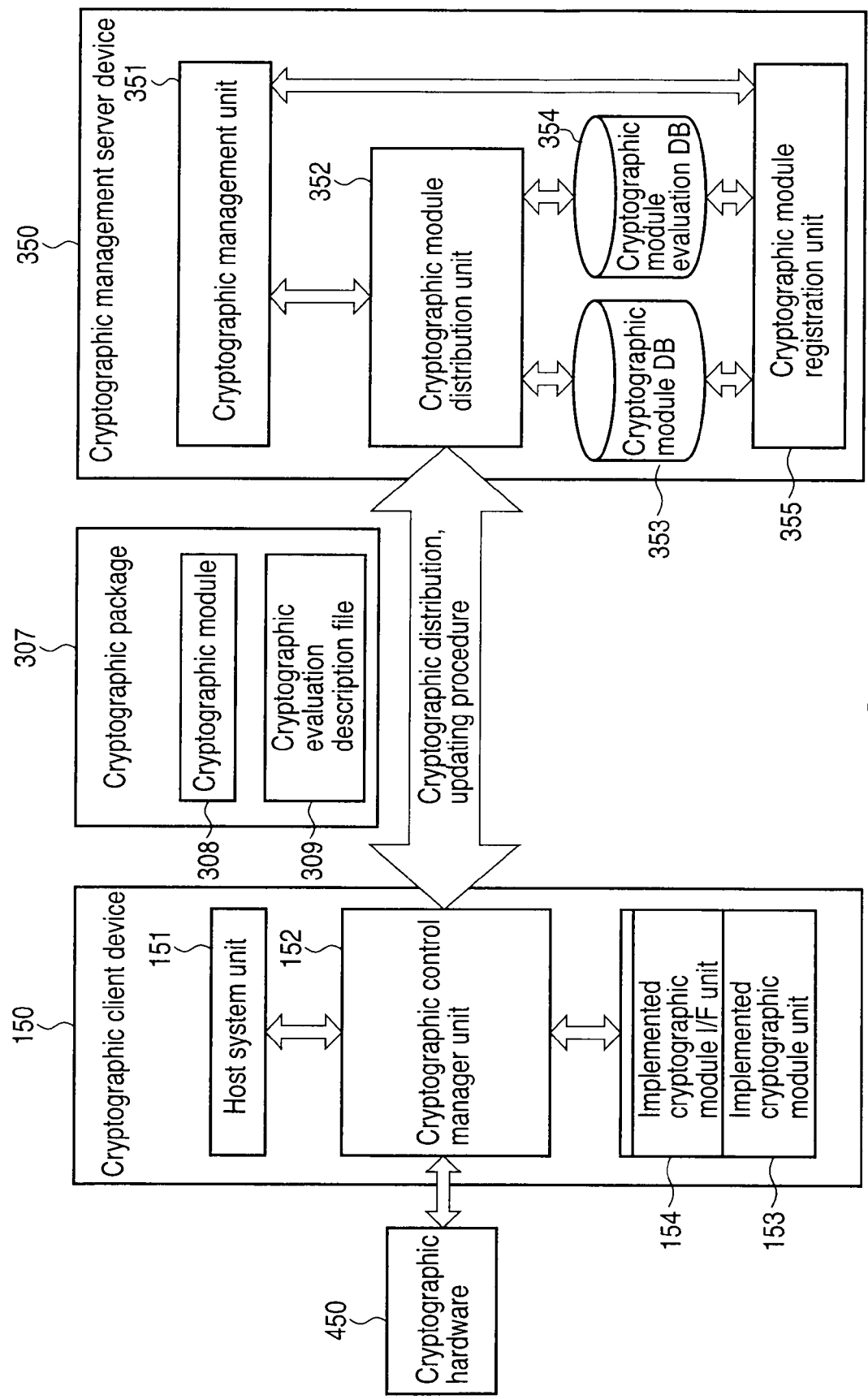
F I G. 1

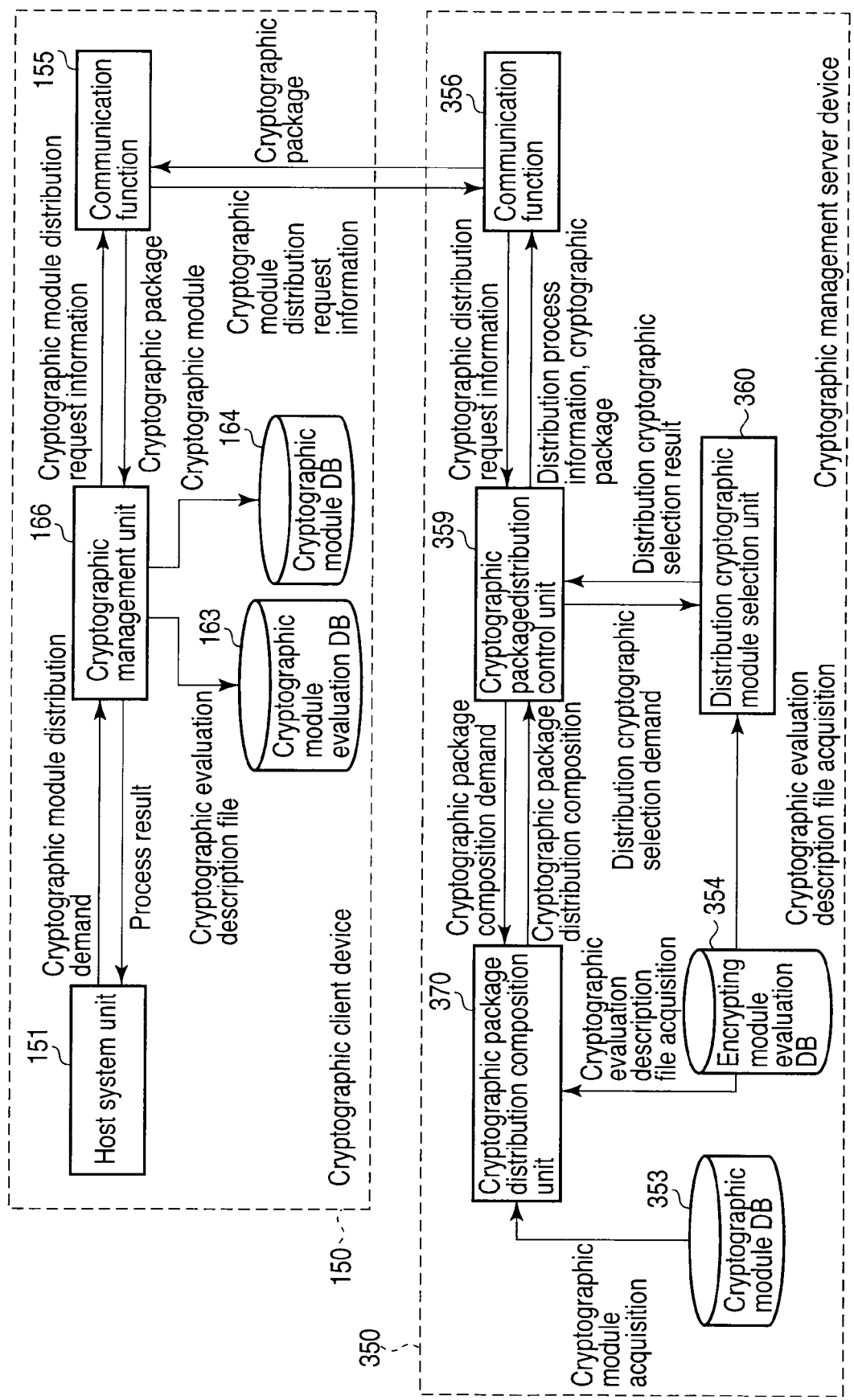
F I G. 9

| | |
|---|---|
| [KEY] Policy (character string of condition information of cryptographic module including category information) | |
| Highest position cryptographic evaluation description ID | Highest position cryptographic evaluation description ID of cryptographic module corresponding to the policy |
| Algorithm ID | Algorithm ID corresponding to the policy |
| Number of cryptographic modules to be linked | Number of cryptographic modules corresponding to the policy |
| Cryptographic module ID group to be linked | End cryptographic module ID (a plurality) corresponding to the policy |
| Key length | Length of cryptographic key used in executing of cryptographic process |

FIG. 13

| | |
|---|---|
| [KEY] Cryptographic evaluation description ID | Cryptographic evaluation description ID including version number |
| Cryptographic evaluation description ID with version number | Corresponding implemented module unit ID in the case of end cryptographic evaluation description unit in tree structure; otherwise, NULL |
| Cryptographic module ID | Category ID of this cryptographic evaluation description unit |
| Category ID | Counting number of reference sources of this cryptographic evaluation description unit (references sources include selection DB and this cryptographic module link DB) |
| Number of references of own cryptographic evaluation description unit | Number of cryptographic evaluation description units position at lower point of this cryptographic evaluation description unit in tree structure |
| Number of cryptographic evaluation description units to be linked | Cryptographic evaluation description unit ID position at lower point of this cryptographic evaluation description unit in tree structure |
| Cryptographic evaluation description unit ID to be linked | |

F I G. 14

| | |
|---|---|
| [KEY] Cryptographic evaluation description ID | |
| Cryptographic evaluation description ID with version number | Cryptographic standard description ID including version number |
| Cryptographic evaluation description ID to be linked | End cryptographic evaluation description ID corresponding to this cryptographic module |
| Category ID | Category ID of this cryptographic module |
| Cryptographic module data number | Data number corresponding to this cryptographic module |
| Module type | Type of this cryptographic module |
| Cryptographic module file name | File name of this cryptographic module |
| Number of selection policies to be linked | Number of policies in selection DB related to this cryptographic module |
| Policy group of selection DB to be linked | Policies in selection DB related to this cryptographic module |

F I G. 15

| | |
|---|---|
| [KEY] Key ID | |
| Storage place information | Information about storage place (none, in terminal, in cryptographic hardware) |
| Key type | Information about cryptographic type (key data, algorithm own parameter, system own parameter, certificate) |
| Key file name | File name of key |
| Key entity | Key entity data |
| Key data cryptographic information | Information about key data cryptographic information (no encryption, use of cryptographic hardware) |
| Key, parameter length | Length information of key and parameter |
| Category ID | Category ID corresponding to this key |
| Algorithm ID | Algorithm ID corresponding to this key |
| Creator | Information about creator of this key |
| Period of use | Information about period of use of this key |
| Limit times of use | Information about limit times of use of this key |

F I G. 16

| | |
|---|---|
| [KEY] Cryptographic process ID | |
| Process type | Information about process type (including key addition, key generation, and cryptographic process) |
| Algorithm ID | Algorithm ID of the corresponding process |
| Cryptographic evaluation description ID | Cryptographic evaluation description ID used as cryptographic process or key generation process |
| Category ID | Category ID of the corresponding process |
| Indirect reference key ID | Key ID of key DB of indirect reference |
| Number of parameters | Number of parameter information groups |
| Parameter information group | Information about type and size of parameter, in addition to the parameter main body |
| Key information group | Information including key parameter type, key ID, and key size |

F I G. 17

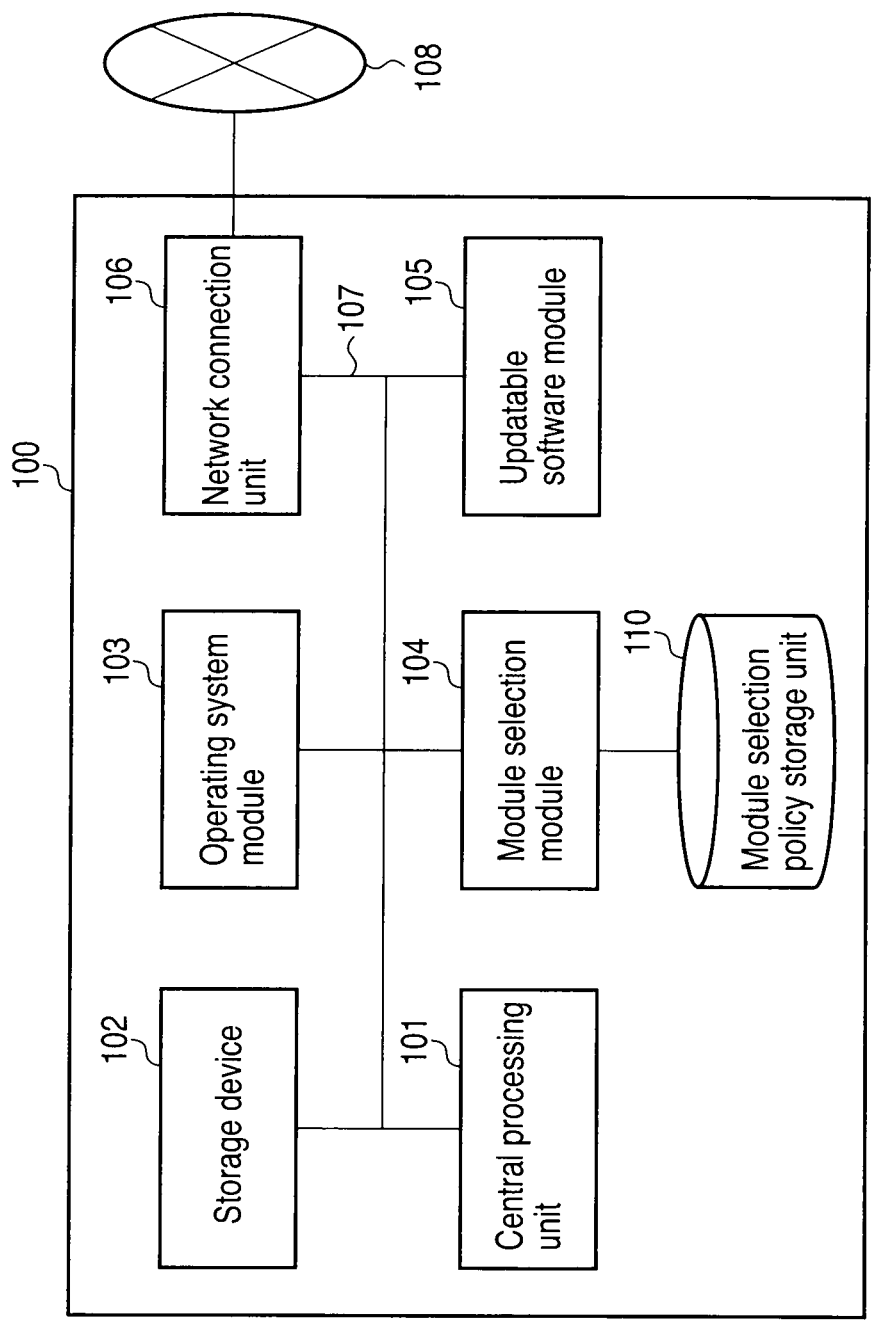
F I G. 27

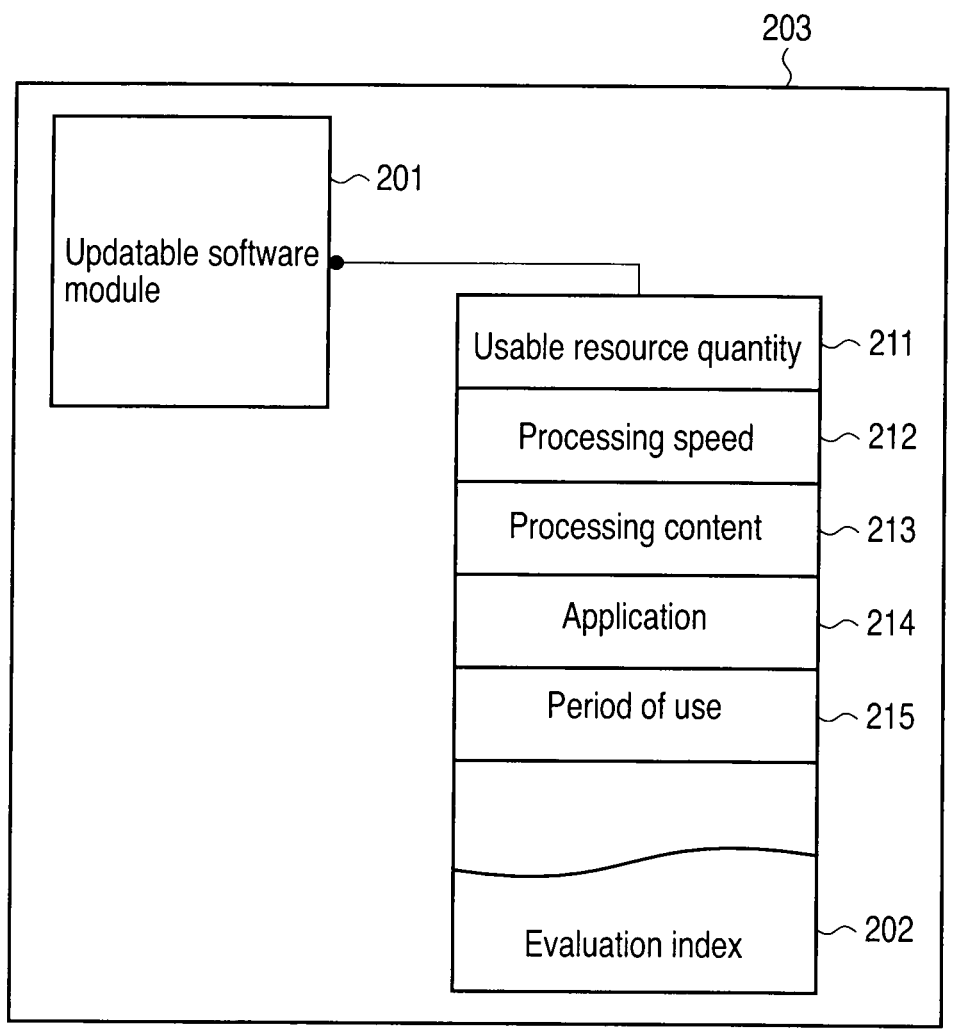
F I G. 2 8

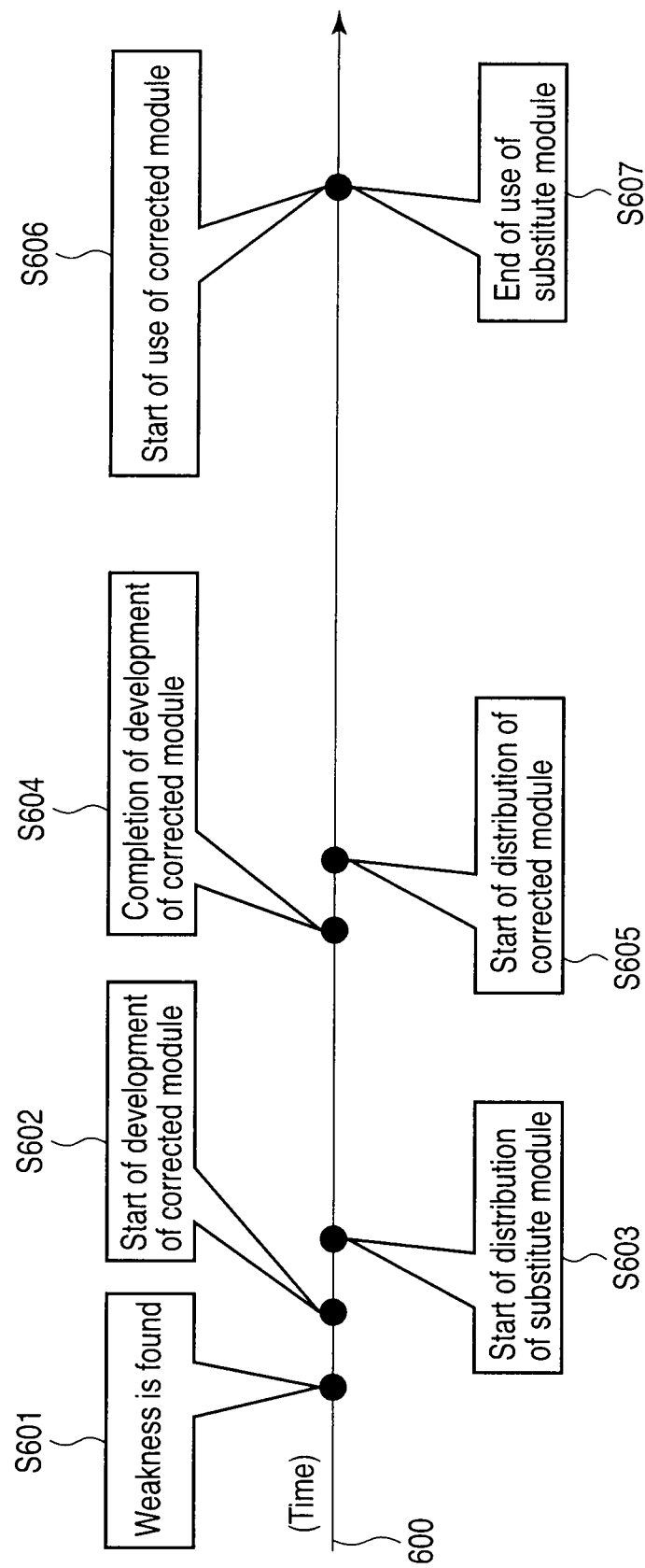
F I G. 32

SOFTWARE MODULE MANAGEMENT DEVICE AND PROGRAM

CROSS-REFERENCE TO RELATED APPLICATIONS

This application is based upon and claims the benefit of priority from prior Japanese Patent Application No. 2007-255964, filed Sep. 28, 2007, the entire contents of which are incorporated herein by reference.

BACKGROUND OF THE INVENTION

1. Field of the Invention

The present invention relates to a software module management device and its program for updating safely the software module such as the operating system or application program.

2. Description of the Related Art

At present, many computing devices are composed of an operating system for operating the device, and various updatable software modules. Applications of software modules are varied. An exclusive software module is developed for an individual application, and various software modules are combined and used. The software modules are updated when it becomes necessary to upgrade a function or improve the performance, or when it becomes necessary to correct weaknesses.

Such computing devices are threatened by attacks by non-users intending to use the software modules unjustly. For example, an implementing weakness correcting method is disclosed in the authentication method called "AES-XCBC-MAC" (see "announce-jp": 1319", <http://home.jp.freebsd.org/cgi-bin/showmail/announce-jp/1319>). By unjust use of this published information and analysis of change position of a correction module, it is known what kind of weakness is caused by which input, and a computer of which a weakness is not corrected yet may be used unjustly.

Conventionally, if a weakness is reported to a reliable organization or a developer, the software module for correcting the weakness is developed, and, generally, the correction software module is distributed, and the weakness is laid open. However, if the weakness is unveiled before distribution of the correction software module, the threat to the computers is increased.

However, too hectic for remedy, if the correction software module cannot be inspected sufficiently, or other weaknesses may be induced, and correction of weakness may become insufficient.

To reduce such threat, new systems are widely proposed, such as a system of checking for presence or absence of distribution of a correction program periodically or by external instruction, and updating the correction program automatically if not distributed yet, or a system of informing the users to urge updating by a correction program.

However, the attackers are similarly provided with the same updating notice information, and are provided with opportunities of analyzing the correction software module and specifying the causative factor of weakness, and the development of attack programs by unjust use of weakness may be encouraged. As a result, the computing devices not corrected yet by the correction software module are exposed to a threat.

On the other hand, from the viewpoint of reducing the damage expansion risk by using common components, when the software module capable of realizing the same function by mutually different procedures is supplied from plural developers or providers (collectively called vendors), the absolute number of software modules, which are targets of attack, can be decreased, but the attacks cannot be prevented. Or, while the correction software module is not applied, the vulnerable software module may be utilized.

In computing devices, various software modules are used. Among them, even software modules provided by other vendors may be exchanged in function. For example, encryption and decryption modules, encoding and decoding modules, communication protocol stacks, and XML (extensible markup language) parsers are exchangeable in most parts except for the core portion of the operating system, depending on the design of computing device.

In the prior art, from the viewpoint of preventing attacks to weakness software modules, the use of an application or software module may be stopped. In this method, there is an advantage that an attack to the software module can be prevented, but the software module cannot be used. To avoid this demerit, while recognizing the threat, without stopping the use of the weakness software module, it may be resultingly attacked, or the weakness may be specified on the basis of the updating urging notice, and it may be attacked.

BRIEF SUMMARY OF THE INVENTION

It is hence an object of the invention to provide a software module management device and its program capable of updating the existing software module safely, by distributing more safely the new software module by correcting the weakness of the existing software module.

In a first aspect of the present invention, there is provided a cryptographic package distribution system comprising a cryptographic client device for executing a cryptographic process on specified subject data to be performed the cryptographic process, and a cryptographic management server device for distributing a cryptographic package suited to the cryptographic process to the cryptographic client device, wherein the cryptographic client devices comprises: a distribution demand information accepting device configured to accept the distribution demand information of the cryptographic package; and a distribution demand information transmission device configured to transmit the distribution demand information of the distribution demand information accepting device to the cryptographic management server device, and the cryptographic management server device comprises: a storage device which stores a cryptographic module for executing the cryptographic process, and an evaluation description file of the cryptographic module related to the cryptographic module; a distribution demand information accepting device configured to receive the distribution demand information transmitted from the distribution demand information transmission device; a cryptographic package generation device configured to generate a cryptographic package by acquiring the cryptographic evaluation description file and the cryptographic module according to the distribution information from the storage device on the basis of the distribution demand information received by the distribution demand information accepting device; and a cryptographic package distribution device configured to distribute the cryptographic package generated by the cryptographic package generation device to the cryptographic client device.

In a second aspect of the present invention, there is provided a cryptographic container distribution system comprising a cryptographic client device for executing a cryptographic process on specified subject data to be performed the cryptographic process, and a cryptographic management server device for distributing a cryptographic container suited to the cryptographic process to the cryptographic client device, wherein the cryptographic client devices comprises: a selection request information accepting device configured to accept the selection request information of the cryptographic module for composing the cryptographic container; a selection request information transmission device configured to transmit the selection request information accepted by the selection request information accepting device to the cryptographic management server device; and a cryptographic container generation information transmission device configured to transmit the cryptographic container generation request information for generating the cryptographic container to the cryptographic management server device; and the cryptographic management server device comprises: a storage device which stores a cryptographic module for executing the cryptographic process, and an evaluation description file of the cryptographic module related to the cryptographic module; a receiving device configured to receive selection request information and cryptographic container generation request information transmitted from the cryptographic client device; a cryptographic evaluation description file identifier extraction device configured to extract an identifier of cryptographic evaluation description file of a cryptographic module corresponding to the selection request information from the storage device on the basis of the selection request information received by the receiving device; a cryptographic container generation necessity investigation request device configured to transmit generation necessity request information of the cryptographic container to the cryptographic client device on the basis of the identifier extracted by the cryptographic evaluation description file identifier extraction device; a cryptographic container generation device configured to generate a cryptographic container from the cryptographic evaluation description file and cryptographic module corresponding to the extracted identifier, on the basis of reply information from the cryptographic client device corresponding to the generation necessity request information transmitted from the cryptographic container generation necessity investigation request device; and a cryptographic container distribution device configured to distribute the cryptographic container generated by the cryptographic container generation device to the cryptographic client device.

In a third aspect of the present invention, there is provided a software module management device for managing the software modules when changing a first software module operating in a terminal device to a second software module, comprising: a storage device which stores a third software module different from the first software module and second software module; a first distribution device which reads out the third software module stored in the storage device, distributes this third software module to the terminal device, and performs changeover from the first software module to the third software module to set the terminal device in a usable state; and a second distribution device which distributes the second software module to the terminal device, and performs changeover from the third software module to the second software module to set the terminal device in a usable state.

BRIEF DESCRIPTION OF THE SEVERAL VIEWS OF THE DRAWING

FIG. 1 is a block diagram showing a configuration of a security information communication system according to the first embodiment of the invention;

FIG. 9 is a diagram showing an example of a distribution operation of a cryptographic package according to the first embodiment of the invention;

FIG. 13 is a diagram showing a data configuration example of a selection DB according to the second embodiment of the invention;

FIG. 14 is a diagram showing a data configuration example of a cryptographic module link DB according to the second embodiment of the invention;

FIG. 15 is a diagram showing a data configuration example of a cryptographic module DB according to the second embodiment of the invention;

FIG. 16 is a diagram showing a data configuration example of a key information DB according to the second embodiment of the invention;

FIG. 17 is a diagram showing a data configuration example of a cryptographic process DB according to the second embodiment of the invention;

FIG. 27 is a block diagram showing a configuration of a computing device according to the third embodiment of the invention;

FIG. 28 is a block diagram showing a configuration of an updatable software module according to the third embodiment of the invention;

FIG. 32 is a diagram showing a distribution operation example of a correction software module in the third embodiment of the invention.

DETAILED DESCRIPTION OF THE INVENTION

Figure 2:
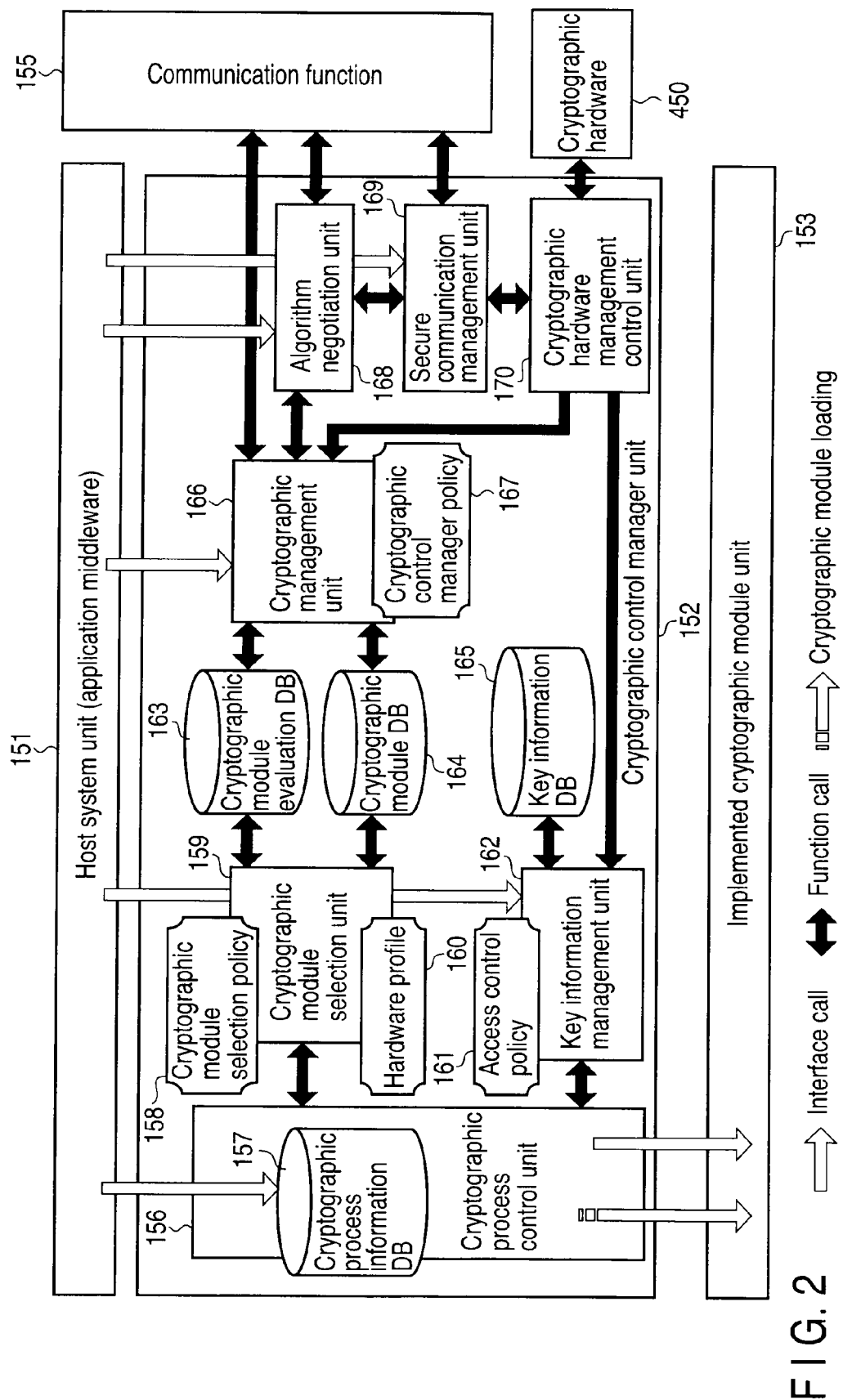
FIG. 2 is a block diagram showing a configuration of a cryptographic client device according to the first embodiment of the invention.

By referring to the accompanying drawings, the outline of this system will be explained (hereinafter called "this system in the first embodiment") containing a software module management device in a first embodiment of the invention (that is, the cryptographic management server device shown in FIG. 1).

First, an outline of this system in the first embodiment is given. In this system in the first embodiment, a server and a client device are connected, and the information encrypted by using the cryptographic module can be transmitted and received between the server and the client device. Herein, the cryptographic module can be exchanged periodically. Such cryptographic system capable of exchanging the cryptographic modules includes several frameworks capable of implementing encryption vendors by specifying an interface that is independent of the cryptographic method in every cryptographic technique. Examples os such are CryptAPI of Microsoft (trademark), JCA Java™ Cryptographic Architecture)/JCE (Java™ Cryptographic Extensions) of Sun (trademark) and CDSA (Common Data Security Architecture) of Open Group (trademark).

In these frameworks, in every cryptographic technique such as encryption/decryption, signature generation/verification, and authenticator generation/verification, the interface for accessing the cryptographic module is specified, and the cryptographic method such as DES (Data Encryption Standard) or AES (Advanced Encryption Standard) can be implemented according to the interface. A professional of cryptography or security, when building up a system, preliminarily selects an appropriate cryptographic method from the implemented cryptographies, and enters the cryptographic method parameter showing which cryptographic method should be used to the framework, so that the cryptographic methods can be changed over.

When using such framework, if the security policy in management of application system is changed, the professional of cryptography or security must select again a cryptographic method suited to the system, and there arise problems of personnel resources of professionals of cryptography and security and problems of cost. Or when a weakness is found in the existing cryptographic method, or a new cryptography is announced, it is hard to apply a change in cryptographic method smoothly in the existing system. Further, depending on the environment of executing the security, if the security intensity or processing speed is different, it is hard to realize an optimum security in the conventional system.

In this system in the first embodiment, such problems can be solved in the cryptographic system capable of changing over in the invention.

First Embodiment

FIG. 1 is a schematic block diagram showing a configuration of this system in the first embodiment of the invention.

This system in the first embodiment is composed of a cryptographic management server device 350 for transmitting a cryptographic package containing a cryptographic module 308 and a cryptographic evaluation description file 309, and a cryptographic client device 150 for executing a cryptographic process by using the cryptographic package 307. Evaluation of cryptographic module described in the cryptographic module evaluation file 309 is the information numerically expressing the reliability and strength of cryptographic method of the corresponding cryptographic module 308, and includes, for example, the security of cryptographic method implemented on the terminal device such as cryptographic client device 150, the cryptographic processing speed, or the key length usable in cryptographic process.

The cryptographic management server device 350 includes a cryptographic module DB 353 accumulating cryptographic modules 308, a cryptographic module evaluation DB 354 accumulating cryptographic evaluation description files 309, a cryptographic management unit 351 for managing the cryptographic module DB 353 and cryptographic module evaluation DB 354, a cryptographic module registration unit 355 for registering new information in the cryptographic module DB 353 and cryptographic module evaluation DB 354, and a cryptographic module distribution unit 352 for reading out an optimum cryptographic package 307 depending on the request from the cryptographic client device 150 from the cryptographic module DB 353 and cryptographic module evaluation DB 354, and transmitting to the cryptographic module distribution unit 352.

The cryptographic client device 150 is composed of a host system unit 151 as application or middleware for calling and utilizing the cryptographic function provided by the implemented cryptographic module unit 153 by way of the cryptographic control manager 152, a cryptographic control manager 152 for changing over the reception of cryptographic package 307 transmitted from the cryptographic management server unit 350 or the cryptographic functions provided from the implemented cryptographic module unit 153, a tamper-resistant cryptographic hardware unit 450 realizing the cryptographic process by the principal cryptographic scheme as hardware, and an implemented cryptographic module unit 153 for providing the cryptographic function having the cryptographic module 308 implementing the cryptographic method in an executable and usable state. The cryptographic management server device 350 executes three procedures of cryptographic module initial registration, distribution, and updating on the basis of a request from the cryptographic client device 150, and thereby transmits an optimum cryptographic package 307 to the cryptographic client device 150.

Herein, the cryptographic module initial registration refers to the transmission of an indispensable cryptographic module 308 from the cryptographic management server device 350 to the implemented cryptographic module unit 153 safely, when the cryptographic client device 150 does not have cryptographic module 308 and implemented cryptographic module unit 153 is not present, by utilizing the cryptographic hardware unit 450 of the cryptographic client device 150.

The cryptographic module distribution is the operation of the cryptographic management server device 350 for selecting an appropriate cryptographic module 308 or cryptographic package 307 and transmitting to the cryptographic client device 150, depending on the cryptographic process request received from the cryptographic client device 150. The cryptographic process request includes the condition information about the cryptographic module. This condition information includes the classification of cryptographic method, such as encryption and signature generation (cryptographic method category), the maker of cryptographic module 308, the hardware information for operating the cryptographic module 308, and the cryptographic module evaluation information. The cryptographic module evaluation information may be handled, as in the embodiment, as a file independent of the cryptographic module 308, as a cryptographic evaluation description file 309.

The cryptographic module updating refers to registering a new cryptographic module 308, deleting the corresponding cryptographic module 308 using an compromised cryptographic method, discovering a bug in the cryptographic module 308 and update the existing cryptographic module 308 and the implemented cryptographic module unit 153 executing this cryptographic module 308, updating the information stored in the cryptographic module DB 353 or cryptographic module evaluation DB 354 on the cryptographic management server device 350 when the cryptographic module evaluation is changed as a result of increase of processing speed of the computer, and transmitting the information of the updated cryptographic package 307 periodically to the cryptographic client device 150, or transmitting based on the request from the cryptographic client device 150, and transmitting a new cryptographic module 308 from the cryptographic management server 350 or to notice inability of the existing implemented cryptographic module unit 153.

FIG. 2 is a specific structural diagram of the cryptographic client device 150. The cryptographic control manager unit 152 is composed of a cryptographic process control unit 156 having a cryptographic module evaluation information DB 157, a cryptographic module selection unit 159 having a cryptographic module DB 164, a cryptographic module evaluation DB 163, a cryptographic module selection policy 158, and a hardware profile 160, a key information management unit 162 having a key information DB 165 and an access control policy 161 describing the access control policy to this key information DB 165, a cryptographic management unit 166 having a cryptographic control manager policy 167, a cryptographic hardware management control unit 170 for communicating with a cryptographic hardware unit 450, a communication function 155 for communicating with outside, an algorithm negotiation unit 168 cooperating with the communication function 155, and a secure communication management unit 169 cooperating with the communication function 155.

The cryptographic process control unit 156 generates the key, registers the key, and encrypts based on the cryptographic process call from the host system unit 151.

In the case of key generation process, the cryptographic process control unit 156 controls (requests, instructs) to select the cryptographic module 308 corresponding to the specified cryptographic method by the cryptographic module selection unit 159, by the identifier of the cryptographic process when the cryptographic method, key length, and cryptographic method parameter designated from the host system unit 151 are registered in the cryptographic process information DB 157.

The cryptographic process control unit 156 loads the selected cryptographic module 308 on the memory, and the implemented cryptographic module unit 153 is set in an executing state. The cryptographic process control unit 156 draws out the cryptographic method parameter for generating a key corresponding to the specified identifier of the cryptographic process from the key information DB 165 by way of the key information management unit 162. The cryptographic process control unit 156 calls the implemented cryptographic module unit 153 by the specified key length and drawn-out cryptographic method parameter, and the implemented cryptographic module unit 153 generates key information. The cryptographic process control unit 156 receives the generated key information. The cryptographic process control unit 156 registers the key information generated by the implemented cryptographic module unit 153 in the key information DB 165 by way of the key information management unit 162, and receives the key identifier corresponding to this key information, and saves the relationship of a newly issued identifier of cryptographic process as a result of processing and the key identifier in the cryptographic process information DB 157, and thereby returns the identifier of the cryptographic process to the host system unit 151.

In the case of key registration, the cryptographic process control unit 156 registers the key information specified by the host system unit 151 in the key information DB 165 by way of the key information management unit 162, and receives the key identifier, and saves the relationship of a newly issued identifier of the cryptographic process as a result of processing and the key identifier in the cryptographic process information DB 157, and thereby returns the identifier of the cryptographic process to the host system unit 151.

In the case of cryptographic process, the condition information about the encryption specified by the host system unit 151, the data (plan text) to be performed a cryptographic process and the identifier of the cryptographic process received when the key is generated or the key is registered are received, and by referring to the condition information about encryption, an appropriate cryptographic module 308 is selected by the cryptographic module selection unit 159, and the selected cryptographic module 308 is loaded on the memory, and the implemented cryptographic module unit 153 is executed, and the key information corresponding to the specified identifier of cryptographic process is drawn out from the key information DB 165 by way of the key information management unit 162, the specified data to be performed the cryptographic process and the drawn-out key information are input to the called implemented cryptographic module unit 153, the corresponding processed encrypted data is received, and the relationship of a newly issued identifier of cryptographic process as a result of processing and the key identifier is saved in the cryptographic process information DB 157, and the identifier of the cryptographic process is returned. By linking the key information used in the cryptographic process to the identifier of cryptographic process, the cryptographic process may be re-executed or decryption may be executed easily.

The cryptographic module DB 164 is a storage unit for storing the cryptographic module 308 received from the cryptographic management server device 350.

The cryptographic module evaluation DB 354 is a storage unit for storing the cryptographic evaluation description file received from the cryptographic management server 350.

The cryptographic module selection unit 159 selects the condition information about encryption including the cryptographic method category such as encryption and signature generation, the maker of cryptographic module 308, the information of the hardware for operating the cryptographic module 308, and cryptographic module evaluation information, and selects the most appropriate cryptographic module 308 among the cryptographic modules 308 stored in the cryptographic module DB 164 on the basis of the input from the host system unit 151. When selecting the cryptographic module 308, by selecting from those conforming to the hardware profile 160 describing the hardware information of the cryptographic client device 150, the one suited also to the cryptographic module selection policy 158 describing the policy of the user of the cryptographic client device 150 is selected.

The hardware profile 160 is the information including the CPU architecture of the cryptographic client device 150, CPU clock, and implementing memory capacity. The cryptographic module selection policy 158 is the information including the preferred condition for the user if plural cryptographic modules are selected by input condition, the maker of the cryptographic module preferred by the user, and the cryptographic method preferred to be prohibited by the user.

The cryptographic module selection unit 159 refers to the input information from the host system unit 151, the hardware profile 160, and the cryptographic module selection policy 158, and selects the cryptographic module 308 coinciding with the input information. When the cryptographic module selection unit 159 uniquely selects a cryptographic module 308, the selected cryptographic module 308 is taken out from the cryptographic module DB 164. The cryptographic module selection unit 159, if failing to uniquely select a cryptographic module 308, issues an error.

The key information management unit 162 stores the information such as key information specified when calling the implemented cryptographic module unit 153 or cryptographic method parameters in the key information DB 165, or reads out the data. The key information management unit 162 relates the plural pieces of information so as to be drawn out in batch if multiple items of specified key information or information of cryptographic method parameters are provided, and registers the resultant information in the key information DB 165. The key information management unit 162 conforms to the cryptographic module selection policy 158 when drawing out the key information or cryptographic method parameter from the key information DB 165, and controls the access to the key information from the plurality of host system units 151.

The key information management unit 162 verifies the validity of the credential by referring to the key identifier intended to access the credential (key or password for access) specified by the host system unit 151 and the identifier of cryptographic process related to the key identifier. The key information management unit 162 approves or rejects access on the basis of the access control policy 161 describing the designation of key information of key information DB 165 accessible for the owner of the credential, and, if accessible, draws out the key identifier corresponding to the identifier of the cryptographic process from the key information DB 165, and draws out the key information corresponding to the key identifier and the cryptographic method parameter, and returns to the host system unit 151. If not accessible, an error is returned to the host system unit 151.

The cryptographic management unit 166 communicates with the cryptographic management server device 350 by way of the communication function 155, and receives the cryptographic package 307, etc. according to the procedure of cryptographic module initial registration, distribution, and updating. When the cryptographic management unit 166 receives the cryptographic package 307 and others from the cryptographic management server device 350, it processes according to the content of the cryptographic control manager policy 167. The content of the cryptographic control manager policy 167 includes, for example, the following five conditions. First is whether or not to execute server authentication in communication with the cryptographic management server device 350. Second is whether or not to encrypt when receiving the cryptographic package 307, etc. from the cryptographic management server device 350. Third is whether or not to add a message authentication code (MAC) when receiving the cryptographic package 307, etc. from the cryptographic management server device 350. Fourth is whether or not to execute verification of the identifier of a received cryptographic package 307, etc. Fifth is setting information about periodic updating showing periodic updating or not or the updating frequency of cryptographic package 307 stored in the cryptographic module evaluation DB 163 and cryptographic module DB 164.

The cryptographic hardware management control unit 170 communicates with the cryptographic hardware 450, and receives the cryptographic package 307 according to the procedure of cryptographic module initial registration from the cryptographic management server device 350. When receiving the cryptographic package 307, if the cryptographic package 307 itself is encrypted, the cryptographic package 307 is decrypted in the cryptographic hardware unit 450. If the MAC is detected in the cryptographic module 308, the cryptographic hardware unit 450 authenticates the cryptographic module 308.

The algorithm negotiation unit 168 cooperates with the communication function 155, and arbitrates the cryptographic method used in architecture of communication session and the cryptographic method used in communication session, prior to architecture of secure communication session between two cryptographic client devices. The cryptographic methods can be arbitrated by any one of the four arbitrary methods given below.

In a first arbitrary method, the cryptographic method is determined solely by the algorithm negotiation unit 168 only from the cryptographic method group provided by the cryptographic module 308 stored in the own cryptographic module DB 164. The algorithm negotiation unit 168 selects an appropriate cryptographic module 308 by referring to the cryptographic module evaluation DB 163 and cryptographic module DB 164, from the condition information about classification of one or more cryptographic methods specified by the host system unit 151 (cryptographic method category), cryptographic control manager policy, hardware profile and encryption, and then determines the cryptographic method. When the classification of cryptographic methods is specified in a plurality, by selecting in each classification of individual cryptographic methods, and the cryptographic methods are determined.

At this time, if a classification of non-determined cryptographic methods is specified by the host system unit 151, the algorithm negotiation unit 168 receives the cryptographic module 308 from the cryptographic management server device 350 by executing the cryptographic module distribution procedure by referring to the condition information about the specified cryptographic module, and this cryptographic module 308 is determined as the cryptographic method. If not determined yet, the algorithm negotiation unit 168 returns an error to the host system unit 151.

When the algorithm negotiation unit 168 determines the cryptographic method, it transmits the cryptographic method arbitration method number, the classification of the obtained cryptographic method, the corresponding group of cryptographic methods, and information about reception or rejection from the cryptographic management server device 350 if in shortage of cryptographic modules 308, to the destination of the cryptographic control manager unit 152 of the partner side specified by the host system unit 151. The cryptographic control manager unit 152 of the received partner side searches for the cryptographic module 308 of the designated cryptographic method from the cryptographic module evaluation DB 163 and the cryptographic module DB 164, and replies that communication is possible when an appropriate cryptographic module 308 for all cryptographic methods is present.

The cryptographic control manager unit 152 of the partner side, if existing cryptographic module 308 is not present, processes according to the information about reception or rejection from the cryptographic management server device 350. That is, if reception is permitted, according to the procedure of cryptographic module distribution, the cryptographic module 308 corresponding to the cryptographic method is received, and after completion of reception, the capability of communication is sent as a reply. If reception is rejected, or when proper cryptographic module 308 is not received if possible, non-capability of communication is sent as a reply. The cryptographic control manager unit 152 transfers the reply from the cryptographic control manager unit 152 of the partner side to the host system unit 151.

In a second arbitrary method, the cryptographic method is determined solely by the cryptographic control manager unit 152 of the partner side only from the cryptographic method group held by the cryptographic control manager unit 152 of the partner side. This is symmetrical to the first arbitrary method, but the procedure is similar.

In a third arbitrary method, the own cryptographic control manager unit 152 determines a common cryptographic method from the cryptographic method group held in both cryptographic control manager units 152.

The algorithm negotiation unit 168 of the own cryptographic control manager unit 152 transmits the cryptographic method arbitration method number and classification of cryptographic methods to the cryptographic control manager unit 152 of the partner side, from the address of the cryptographic control manager unit 152 of the partner side, together with the classification of one or more cryptographic methods (cryptographic method category) specified by the host system unit 151. The cryptographic control manager unit 152 of the partner side selects all corresponding cryptographic modules 308 by referring to the received information such as the classification of cryptographic methods, cryptographic module evaluation DB 163 and cryptographic module DB 164 from the hardware profile, and compiles a list of cryptographic methods corresponding to all selected cryptographic modules 308.

At this time, the cryptographic control manager unit 152 of the partner side selects the cryptographic module 308 in every classification of cryptographic methods if a plurality of classifications of cryptographic methods is specified, and compiles a list of cryptographic methods. The cryptographic control manager unit 152 of the partner side transmits the list of cryptographic methods of each classification of cryptographic methods to the own cryptographic control manager unit 152. From the condition information about one or more classifications of cryptographic methods (cryptographic method category) specified by the host system unit 151, the cryptographic control manager policy, hardware profile, and other encryption, the own cryptographic control manager unit 152 receiving the list of cryptographic methods in each classification of cryptographic methods selects an appropriate cryptographic module 308 by referring to the cryptographic module evaluation DB 163 and the cryptographic module DB 164, and determines the cryptographic method from the selected cryptographic module 308.

At this time, the cryptographic control manager unit 152, when the classification of cryptographic methods is specified in a plurality, selects in every classification of cryptographic methods, and determines the cryptographic method. For example, in the following cases, it is assumed that the cryptographic method corresponding to the classification of cryptographic methods is determined. First, when the cryptographic method selected by the own cryptographic control manager unit 152 is present in the list of cryptographic methods. Next, when the own cryptographic control manager unit 152 possesses the cryptographic module 308 corresponding to any one of the cryptographic methods included in the list of cryptographic methods received by the own cryptographic control manager unit 152. Otherwise, it is assumed that the cryptographic method corresponding to the classification of cryptographic methods is not determined.

The cryptographic control manager unit 152 specifies any one list of received cryptographic methods if there is a non-determined classification of cryptographic methods, and receives the cryptographic module 308 from the cryptographic management server device 350 according to the procedure of cryptographic module distribution. The cryptographic control manager 152 performs a similar process on all cryptographic methods in the list of cryptographic methods until receiving the corresponding cryptographic module 308. If not determined yet, the cryptographic method about the classification of corresponding cryptographic method is not determined. When the process is finished in the classification of all cryptographic methods, information indicating determination or no determination of cryptographic methods of classification of all cryptographic methods is transmitted to the cryptographic control manager unit 152 of the partner side.

In a fourth arbitrary method, from the cryptographic method group held in both cryptographic control manager units, a cryptographic method common to the cryptographic control manager unit 152 of the partner side is determined. This is symmetrical to the third arbitrary method, but the procedure is similar.

The algorithm negotiation unit 168 arbitrates in any one of the above four methods of arbitration.

The secure communication management unit 169 cooperates with the communication function 155, and builds up a secure communication session with another cryptographic client device 150. The secure communication management unit 169, when building up a safe communication, determines a cryptographic method to be used in a communication session architecture and a cryptographic method to be used in a communication session by the algorithm negotiation unit 168, and then shares the session key. After architecture of secure communication session, according to the determined cryptographic method, the session key is used, and the authenticator can be added for encrypting the communication data or preventing unjust alteration of communication data. The secure communication management unit 169 enables to hold the communication session, if once built up, to be used again within a specific time.

The secure communication management unit 169 transmits a secure connection request to the destination of communication partner specified by the host system unit 151, and sends notice of the start of secure connection. The secure communication management unit 169 establishes the secure connection according to the classification of cryptographic methods determined in advance by the algorithm negotiation unit 168. The classification of cryptographic methods includes, for example, authentication, key sharing, common key cryptosystem (stream cipher or block cipher), public key cryptosystem, data authentication (MAC authentication or signature authentication), pseudo-random number generation (stream encryption or public key cryptosystem only), session key leading-out, MAC key leading-out (MAC authentication only), etc. The secure communication management unit 169 processes authentication if authentication is necessary in secure connection.

The secure communication management unit 169 further shares the key by the key sharing process, and establishes the secure session. However, when the cryptographic method of public key cryptosystem has been arbitrated, the key sharing process is not executed. In the case of encrypted communication without public key cryptosystem, from the shared key, a session key is created by the session key lead-out method, and the data to be transmitted is encrypted by the common key cryptosystem method, and the encrypted key is transmitted to the partner. The partner of communication generates the session key in a similar method, and the received data is decrypted according to the common key cryptosystem method.

The secure communication management unit 169, in the case of execution of encrypted communication of public key cryptosystem, generates a random session key according to the pseudo-random number generation method, and encrypts the data to be transmitted by the session key according to the common key cryptosystem method, receives the public key of the communication partner from a credit organization, encrypts the session key itself by the public key of the communication partner according to the public key cryptosystem method, and transmits the encrypted data and the encrypted session key to the partner. The communication partner decrypts the encrypted session key by the own secret key, and decrypts the received data by the session key according to the common key cryptosystem method.

The secure communication management unit 169, in the case of communication with data authenticator and in the case of MAC authentication, generates a MAC key by the MAC key lead-out method from the shared key, and adds MAC data to the data intended to be transmitted according to the MAC authentication method, and transmits the data with MAC to the partner. The communication partner generates the MAC key by a similar method, and authenticates the MAC of the receive data according to the MAC authentication method.

The secure communication management unit 169, in the case of communication with a data authenticator and in the case of signature authentication, adds the signature by the own secret key, and transmits the data with signature to the partner. The communication partner receives the public key of the communication partner from the credit organization where the public key of the partner is registered, and verifies the validity of the partner's public key, and when verified normally, verifies the data with signature received by the partner's public key according to the signature authentication method.

Figure 3:
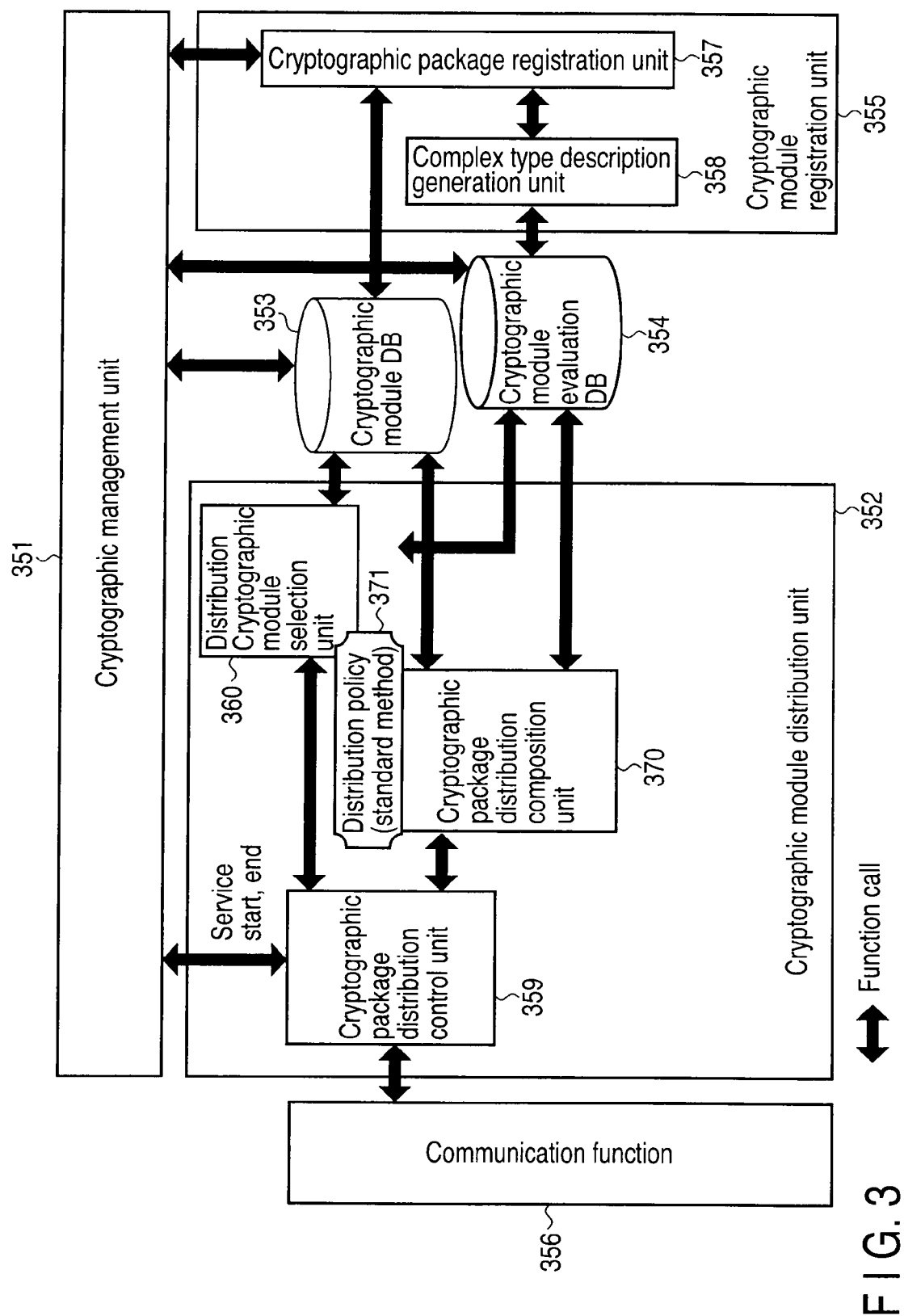
FIG. 3 is a block diagram showing a configuration of a cryptographic management server device according to the first embodiment of the invention.

FIG. 3 is a specific structural diagram of the cryptographic management server device 350. The cryptographic management server device 350 is composed of a cryptographic module DB 353, a cryptographic module evaluation DB 354, a cryptographic management unit 351 for reading out or updating the information stored in the cryptographic module DB 353 or cryptographic module evaluation DB 354, a cryptographic module registration unit 355 for registering information in the cryptographic module DB 353 or cryptographic module evaluation DB 354, and a cryptographic module distribution unit 352 for distributing the encryption to the cryptographic client device 150.

The cryptographic module DB 353 is a database storing the cryptographic modules 308 stored preliminarily or entered by the user.

The cryptographic module evaluation DB 354 is a database storing cryptographic evaluation description files 309 stored preliminarily or entered by the user.

The cryptographic management unit 351 has an interface relating with the user of the cryptographic management server device 350, for searching the cryptographic module 308 or cryptographic package 307 stored in the cryptographic module DB 353 or cryptographic module evaluation DB 354, displaying the contents in the cryptographic module evaluation unit, displaying a list of managed cryptographic modules, updating the existing cryptographic modules, deleting the existing cryptographic modules, registering new cryptographic modules, and starting/end cryptographic module distribution unit. The cryptographic management unit 351, when registering a new cryptographic module, requests the cryptographic module registration 355 for registration.

The cryptographic module registration 355 includes a cryptographic package registration unit 357, and a complex type description generation unit 358.

The cryptographic module distribution unit 352 includes a cryptographic package distribution control unit 359, a cryptographic package distribution composition unit 370 having a distribution policy 371, and a distribution cryptographic module selection unit 360 having the distribution policy 371.

The cryptographic package distribution control unit 359 interprets the request from the cryptographic client device 150, and executes a waiting service for executing three procedures of cryptographic module initial registration, distribution, and updating. In this waiting service, the log of processing content is recorded.

The distribution cryptographic module selection unit 360 selects a cryptographic module 308 suited to distribution on the basis of three procedures of cryptographic module initial registration, distribution, and updating, and the request from the cryptographic client device 150. In the case of cryptographic module initial registration, the cryptographic module 308 to be distributed is defined to be indispensable, and it is a cryptographic method described in the distribution policy 371.

In the cryptographic package distribution composition unit 370, on the basis of the cryptographic module 308 selected in the distribution cryptographic module selection unit 360, according to the distribution policy 371, the cryptographic module 308 and the cryptographic evaluation description file 309 corresponding to the cryptographic module 308 are composed so as to be distributed as the cryptographic package 307. The distribution policy 371 describes, for example, the following four items.

A first item is whether or not to encrypt when distributing the cryptographic package 307. A second item is a cryptographic method when encrypting the cryptographic package 307. A third item is whether or not to add a MAC when distributing the cryptographic package 307. A fourth item is a cryptographic method of a MAC for cryptographic package 307.

In the composition process to be executed by the cryptographic package distribution composition unit 370, the content stored in the cryptographic module evaluation DB 354 is generated as cryptographic evaluation description file 309 in a specified format, and the cryptographic package 307 is provided with an authenticator for the purpose of authenticating distribution by the cryptographic management server device 350, and the cryptographic module 308 and the cryptographic evaluation description file 309 are formed as a pair, and summed up as a cryptographic package 307.

The cryptographic package distribution composition unit 370 may also compile one cryptographic package by assembling the cryptographic module 308 combining a plurality of cryptographic modules 308, with the plurality of cryptographic modules 308 and the corresponding cryptographic evaluation description file 309. In the composition process to be executed by the cryptographic package distribution composition unit 370, according to the cryptographic control manager policy of the cryptographic client device 150 or the distribution policy 371 of the cryptographic management server device 350, the cryptographic package 307 is encrypted, the MAC is added, or the key is generated and the key is managed for this purpose.

Figure 4:
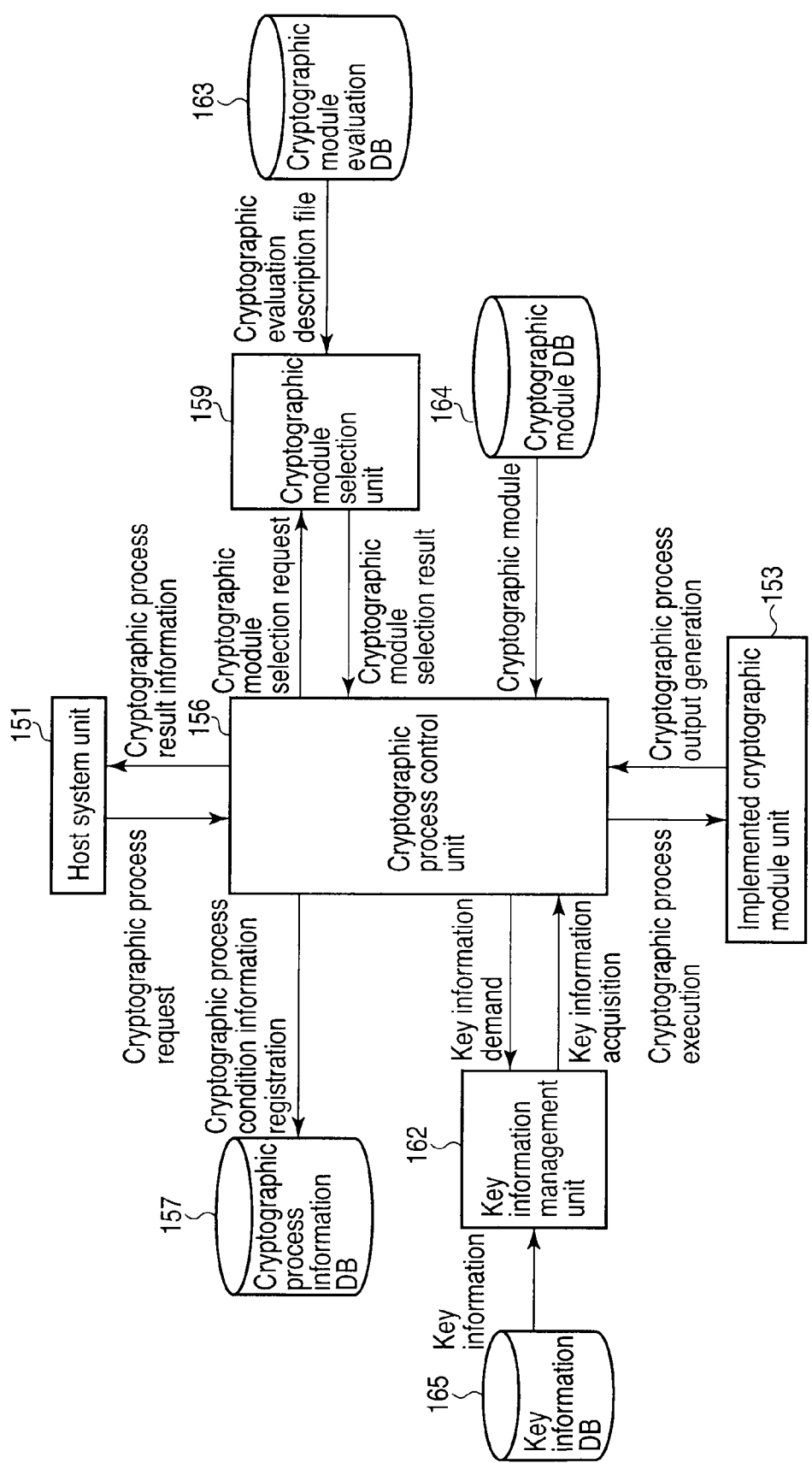
FIG. 4 is a diagram showing an example of a cryptographic process operation of a cryptographic client device according to the first embodiment of the invention.
Figure 5:
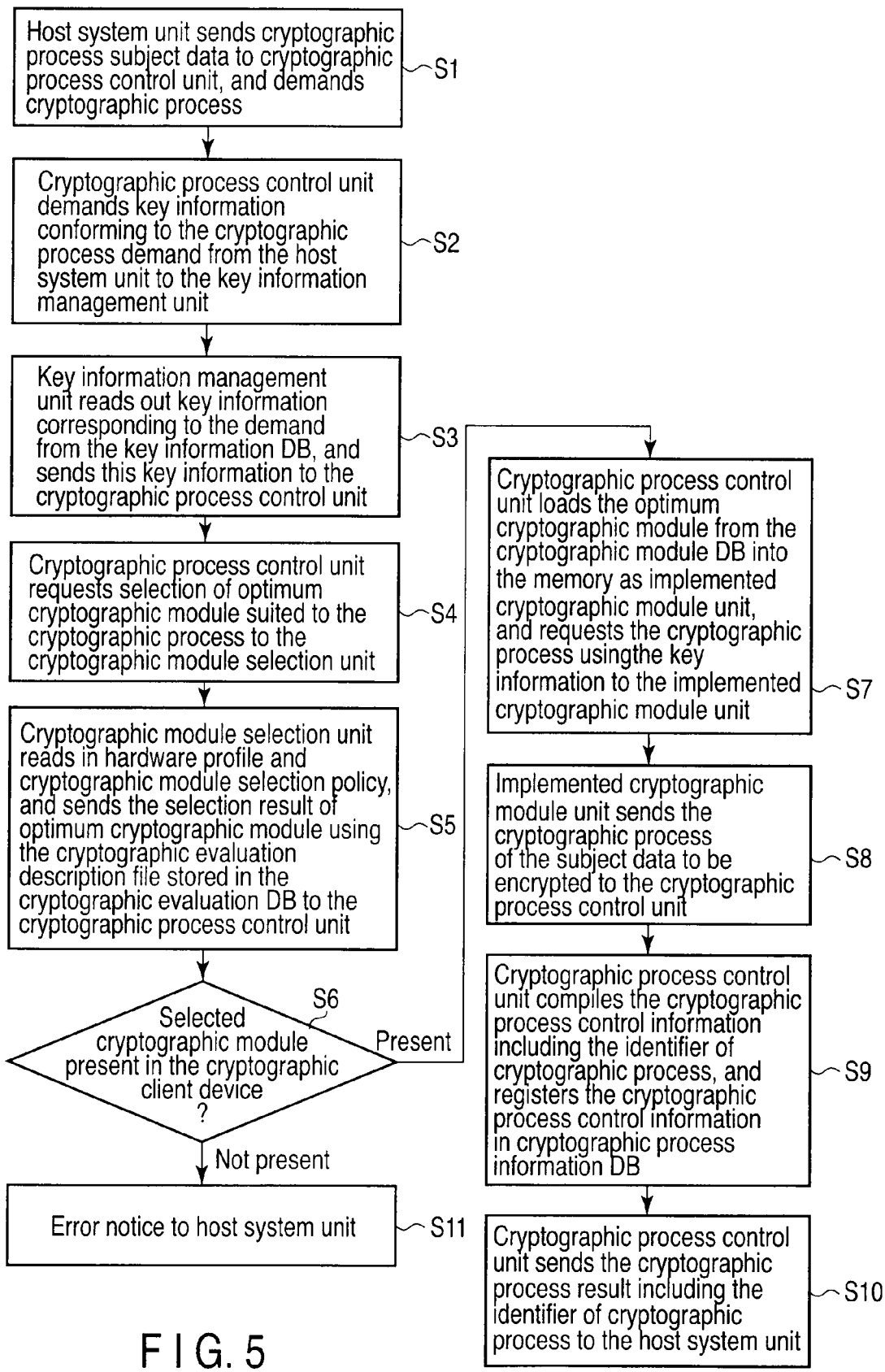
FIG. 5 is a diagram showing an example of a cryptographic process flow of a cryptographic client device according to the first embodiment of the invention.
Figure 6:
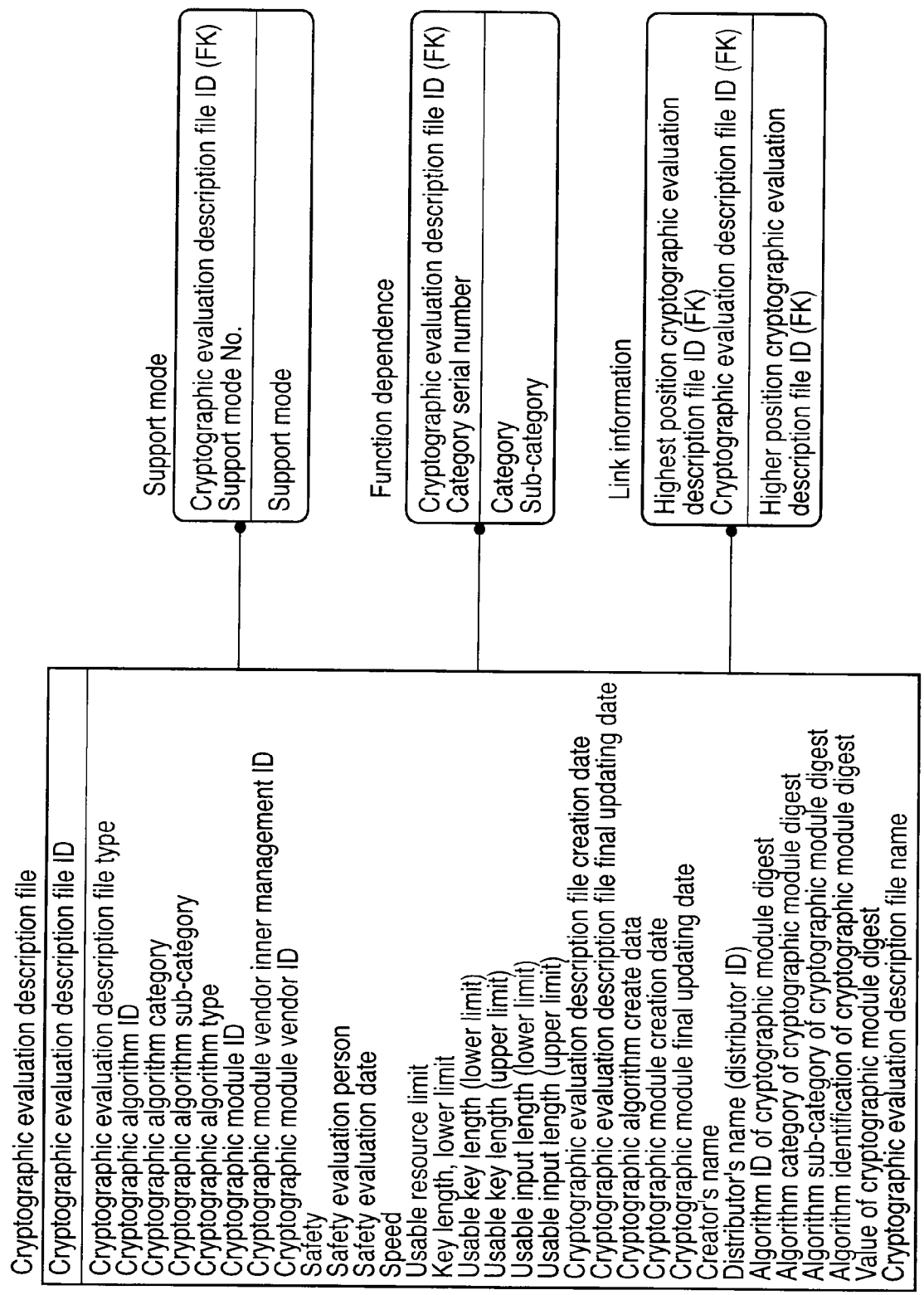
FIG. 6 is a diagram showing an example of a configuration of a cryptographic module evaluation DB according to the first embodiment of the invention.
Figure 7:
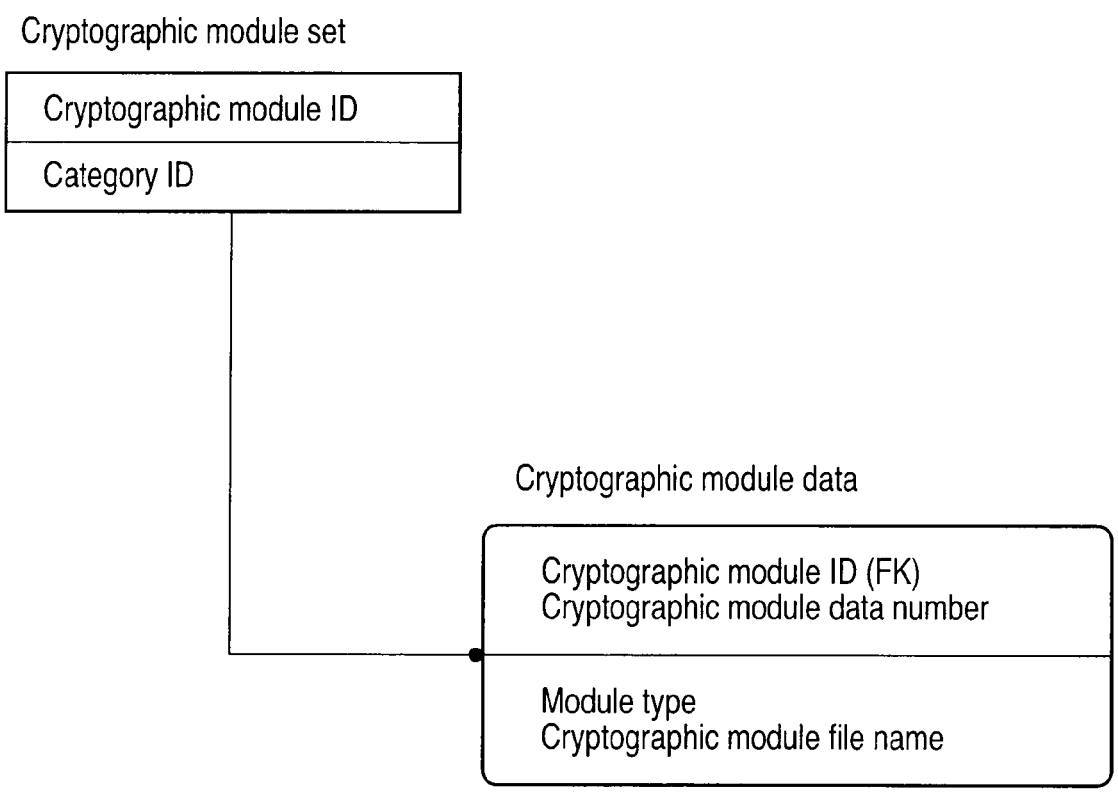
FIG. 7 is a diagram showing an example of a configuration of a cryptographic module evaluation DB according to the first embodiment of the invention.
Figure 8:
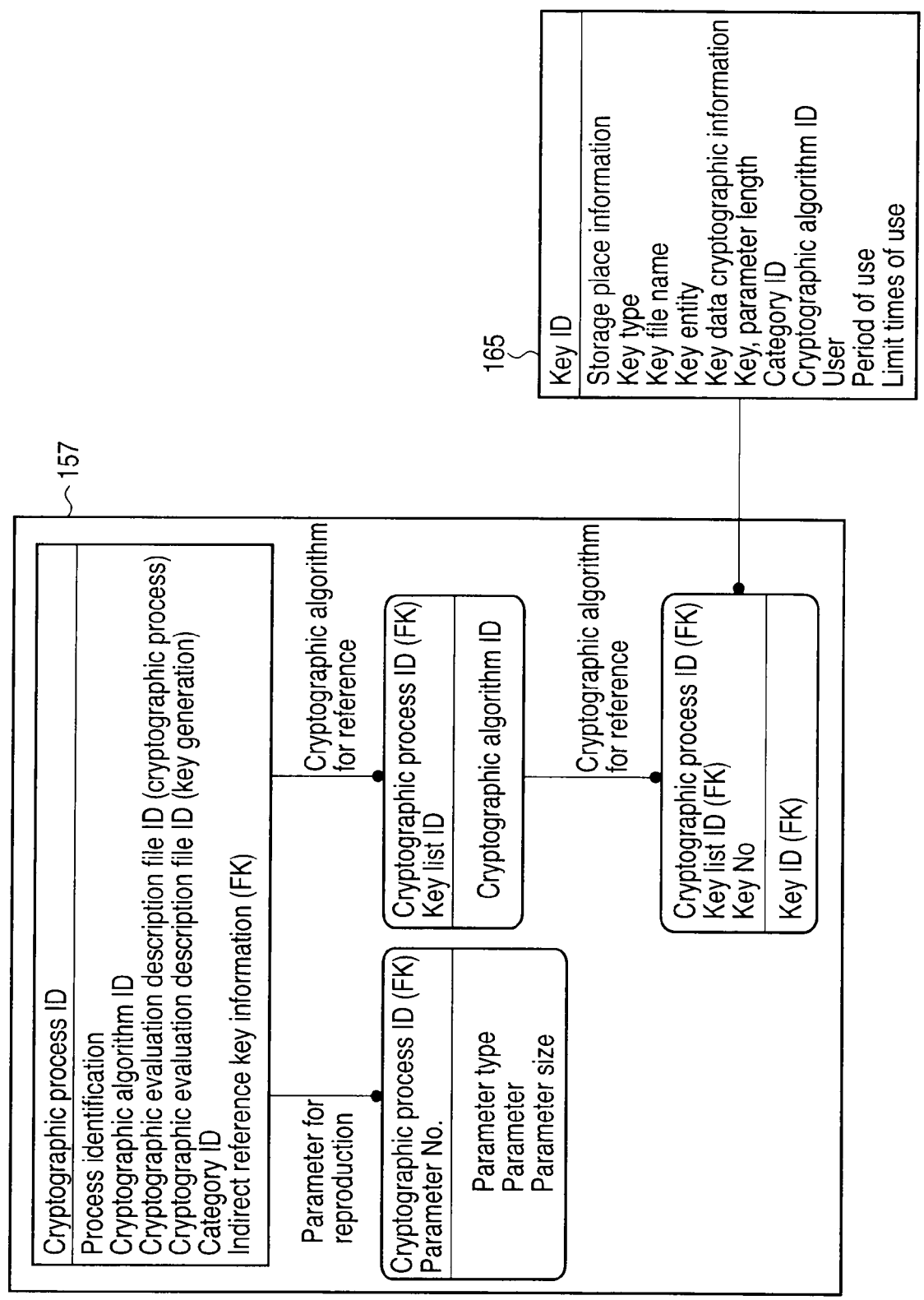
FIG. 8 is a diagram showing an example of a configuration of a cryptographic process information DB and key information DB according to the first embodiment of the invention.

In the first embodiment of the invention, in the cryptographic client device 150, in response to the cryptographic process request from the host system unit 151, the cryptographic process control unit 156 selects an appropriate cryptographic module, and executes a cryptographic process, and issues the cryptographic process result to the host system unit 151, and this cryptographic process operation is explained below. FIG. 4 is a diagram of an example of a cryptographic process operation of the cryptographic client device. FIG. 5 is a diagram of an example of a cryptographic process flow of the cryptographic client device. FIG. 6 is a diagram of an example of a configuration of a cryptographic module evaluation DB. FIG. 7 is a diagram of an example of a configuration of a cryptographic module evaluation DB. FIG. 8 is a diagram of an example of a configuration of a cryptographic process information DB and key information DB.

The support mode is the information such as an operation mode of common key encryption, or the supported standard name. In the ECDSA system, for example, v1.0 of SECG SEC1 is supported. In the cryptographic process information DB, the cryptographic evaluation description file ID (cryptographic process) is a cryptographic evaluation description file ID corresponding to the cryptographic module used in this cryptographic process. In the cryptographic process information DB, the cryptographic evaluation description file ID (key generation) is a cryptographic evaluation description file ID related to the additional registration of the cryptographic key used in this cryptographic process in the cryptographic process DB 157, or a cryptographic evaluation description file ID corresponding to the cryptographic module used in execution of key generation of the cryptographic key in the corresponding cryptographic control manager unit 152.

An example of a cryptographic process operation of the cryptographic client device in the first embodiment is described below. The host system unit 151 receives the cryptographic process request information including the data to be performed a cryptographic process and the identifier of the category of cryptographic process, and requests a cryptographic process to the cryptographic process control unit 156 (step S1). The cryptographic process control unit 156 requests key information corresponding to the cryptographic process request information from the host system unit 151 to the key information management unit 162 (step S2). The key information management unit 162 acquires the intended key information from the key information DB 165, and issues it to the cryptographic process control unit 156 (step S3).

The cryptographic process control unit 156 enters the cryptographic process request information from the host system unit 151 to the cryptographic module selection unit 159, and requests selection of an appropriate cryptographic module (step S4). The cryptographic module selection unit 159 reads in the hardware profile 160 and the cryptographic module selection policy 158. By properly reading out the cryptographic module evaluation standard file of the cryptographic module evaluation DB, an appropriate cryptographic module for the cryptographic process is selected. The cryptographic module selection unit 159 issues the selection result including the cryptographic module evaluation description ID corresponding to the selected cryptographic module to the cryptographic process control unit 156 (step S5).

The cryptographic process control unit 156, if the selected cryptographic module is not present in the corresponding cryptographic client device 150, issues an error to the host system unit, and terminates the process (step S6, step S11). When the selected cryptographic module is present in the corresponding cryptographic client device 150, the cryptographic process control unit 156 loads the cryptographic module selected in the cryptographic module selection unit 159 into the memory as the implemented cryptographic module unit 153.

The cryptographic process control unit 156 receives the key information or the cryptographic process object data issued from the key information management unit 162, and requests the cryptographic process to the implemented cryptographic module unit 153 (step S6, step SD7). The implemented cryptographic module unit 153 issues the cryptographic process result corresponding to the cryptographic process object data to the cryptographic process control unit 156 (step S8).

The cryptographic process control unit 156 registers the execution environment information of the cryptographic process, including the key information obtained from the key information management unit 162 and the selection result information obtained from the cryptographic module selection unit 159, in the cryptographic process information DB as execution condition information of the cryptographic process by relating it with the cryptographic process ID issued to the cryptographic process (step S9). The cryptographic process control unit 156 issues the cryptographic process result information including the cryptographic process result data corresponding to the cryptographic process ID and cryptographic process object data to the host system unit 151 (step S10).

Figure 10:
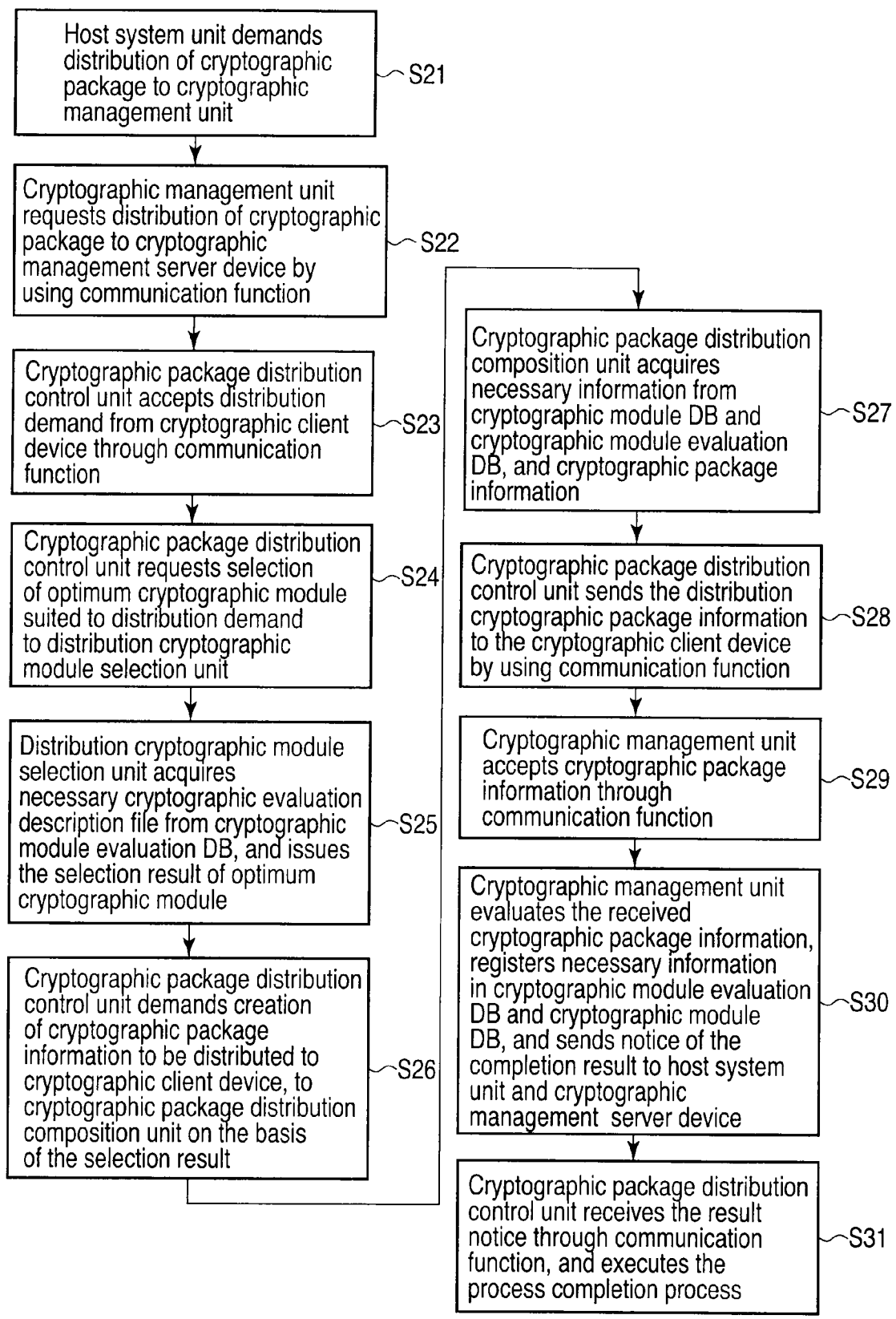
FIG. 10 is a diagram showing an example of a distribution process flow of a cryptographic package according to the first embodiment of the invention.

If the cryptographic client device 150 does not include an optimum cryptographic module suited to the cryptographic process request or the cryptographic management domain from the host system unit 151 or the security policy of the cryptographic client device 150, the cryptographic module and the cryptographic package including the corresponding cryptographic evaluation description file are acquired from the cryptographic management server device 350. FIG. 9 is a diagram of a distribution operation example of a cryptographic package. FIG. 10 is a diagram of a distribution process flow example of a cryptographic package.

The cryptographic client device 150 acquires the cryptographic package from the cryptographic management server device 350 in the following procedure. The host system unit 151 request acquisition of cryptographic packages insufficient in its cryptographic client device 150 to the cryptographic management unit 166 (step S21). The cryptographic management unit 166, using the communication function 155, transmits cryptographic package distribution request information including the hardware profile of the cryptographic client device 150 to the cryptographic management server device 350 (step S22).

The cryptographic package distribution control unit 359 receives the cryptographic package distribution request information from the cryptographic client device 150 through the communication function 356 (step S23). The cryptographic package distribution control unit 359 requests selection of an optimum cryptographic module suited to the distribution request from the cryptographic client device 150 to the distribution cryptographic module selection unit 360 (step S24). The distribution cryptographic module selection unit 360 selects the optimum distribution cryptographic module suited to the request on the basis of the selection input information including the cryptographic package distribution request information from the cryptographic client device 150 and the cryptographic evaluation description file of the cryptographic module evaluation DB 354, and issues the selection result to the cryptographic package distribution control unit 359 (step S25).

The cryptographic package distribution control unit 359, using the selection result information at step S25, requests compilation of distribution cryptographic package information to the cryptographic package distribution composition unit 370 (step S26). The cryptographic package distribution composition unit 370, using the cryptographic module DB and cryptographic module evaluation DB, issues the cryptographic package 307 including the cryptographic module 308 corresponding to the distribution package information compilation request at step S26 and the cryptographic evaluation description file 309 to the cryptographic package distribution control unit 359 (step S27).

The cryptographic package distribution control unit 359, using the communication function 356, transmits the cryptographic package information including the cryptographic package 307 to the cryptographic client device 150 (step S28). The cryptographic management unit 166 receives the cryptographic package information from the cryptographic management server device 350 by way of the communication function 155 (step S29).

The cryptographic management unit 166 executes evaluation of cryptographic package information including the authenticator verification of the cryptographic evaluation description file 309. When the evaluation does not satisfy the condition for continuing the process, an error is issued to the cryptographic management server device 359 and the host system 151, and the process is terminated. If the condition is satisfied, from the cryptographic package information, the cryptographic module 308 and cryptographic evaluation description file 309 are decomposed, and registered in the cryptographic module DB 164 and the cryptographic module evaluation DB 163. The cryptographic management unit 166, using the host system unit 151 and the communication function 155, issues the completion result to the cryptographic management server device 350 (step S30). The cryptographic package distribution control unit 359 receives the completion notice from the cryptographic client device 150 through the communication function 356, and executes the completion process of the process including disconnection of communication (step S31).

If the selected cryptographic module is not found in the corresponding cryptographic client device 150, the cryptographic process control unit 156 may automatically cooperated with, not passing through the host system unit 151, the cryptographic control manager unit 152, requesting to distribute the insufficient cryptographic modules from the cryptographic management server unit 350 to the cryptographic management unit 166. When the evaluation of the cryptographic package information distributed from the cryptographic management server device 350 does not satisfy the condition for continuing the process, instead of terminating the process by sending error, a re-distribution depending on the content of error may be requested continuously to the cryptographic management server device 350.

Second Embodiment

Figure 11:
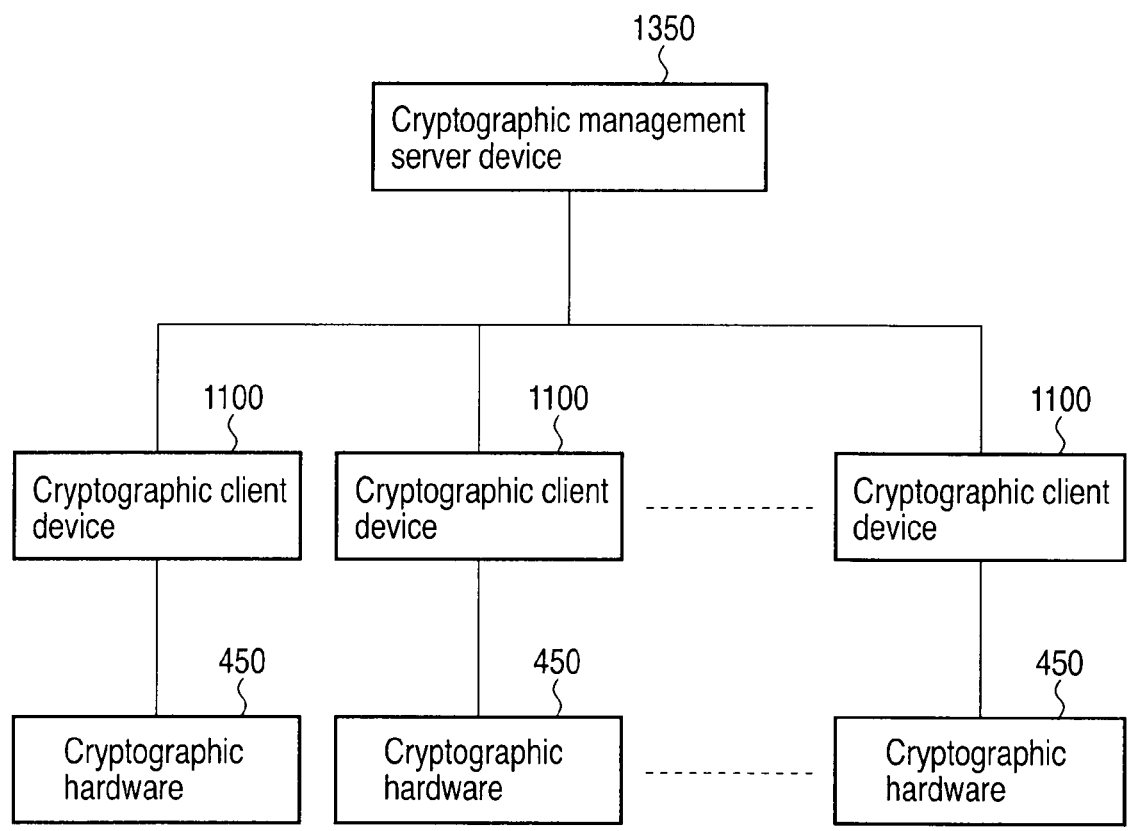
FIG. 11 is a block diagram showing a configuration of a security information communication system in a second embodiment of the invention.

In the first embodiment, selection of the optimum cryptographic method processed by the cryptographic client device is explained. In the second embodiment, the cryptographic management server device assumes leadership in selection of the optimum cryptographic method. That is, as shown in FIG. 11, in the system composed of a cryptographic management server device 1350, a plurality of cryptographic client devices 1100, and cryptographic hardware 450 corresponding to the cryptographic client devices 1100 (hereinafter called this system in the second embodiment), the result information of the cryptographic method selected by the cryptographic management server device 1350 is managed and utilized in a module selection policy storage unit 110 by a server reinforced linkage mechanism. In particular, if the computation capability of the module selection policy storage unit 110 is insufficient, the cryptographic management server device 1350 supports the computation, and the response performance in the cryptographic client device 1100 can be enhanced.

Specifically, the cryptographic management server device 1350 selects the optimum cryptographic module 308 suited to the request from the host system unit 1151, the cryptographic control manager unit 1152 of the cryptographic client device 1100 receives the result, and the relation between the request condition and the optimum cryptographic module 308 is managed in the cryptographic information storage unit 1600 in the device. The cryptographic control manager unit 1152 processes according to the cryptographic process control request from the host system unit 1151, on the basis of the relation between the request from the host system unit 1151 and the optimum cryptographic module 308 suited to this request. Differing from the first embodiment, the cryptographic client device 1100 does not always require the management of cryptographic package 307 or reception from the cryptographic management server device 1350 necessary for the all-selection function of cryptographic module 308 or selection of cryptographic module 308.

FIG. 11 is a block diagram of a schematic configuration of this system in the second embodiment of the invention. This system in the second embodiment includes one or more cryptographic client devices 1100, one or more cryptographic hardware units 450, and a cryptographic management server device 1350. The cryptographic hardware 450 is the same as in the first embodiment. A plurality of cryptographic hardware units 450 may be connected for each cryptographic client device 1100. The cryptographic hardware 450 may be incorporated inside of the cryptographic client device 1100.

Figure 12:
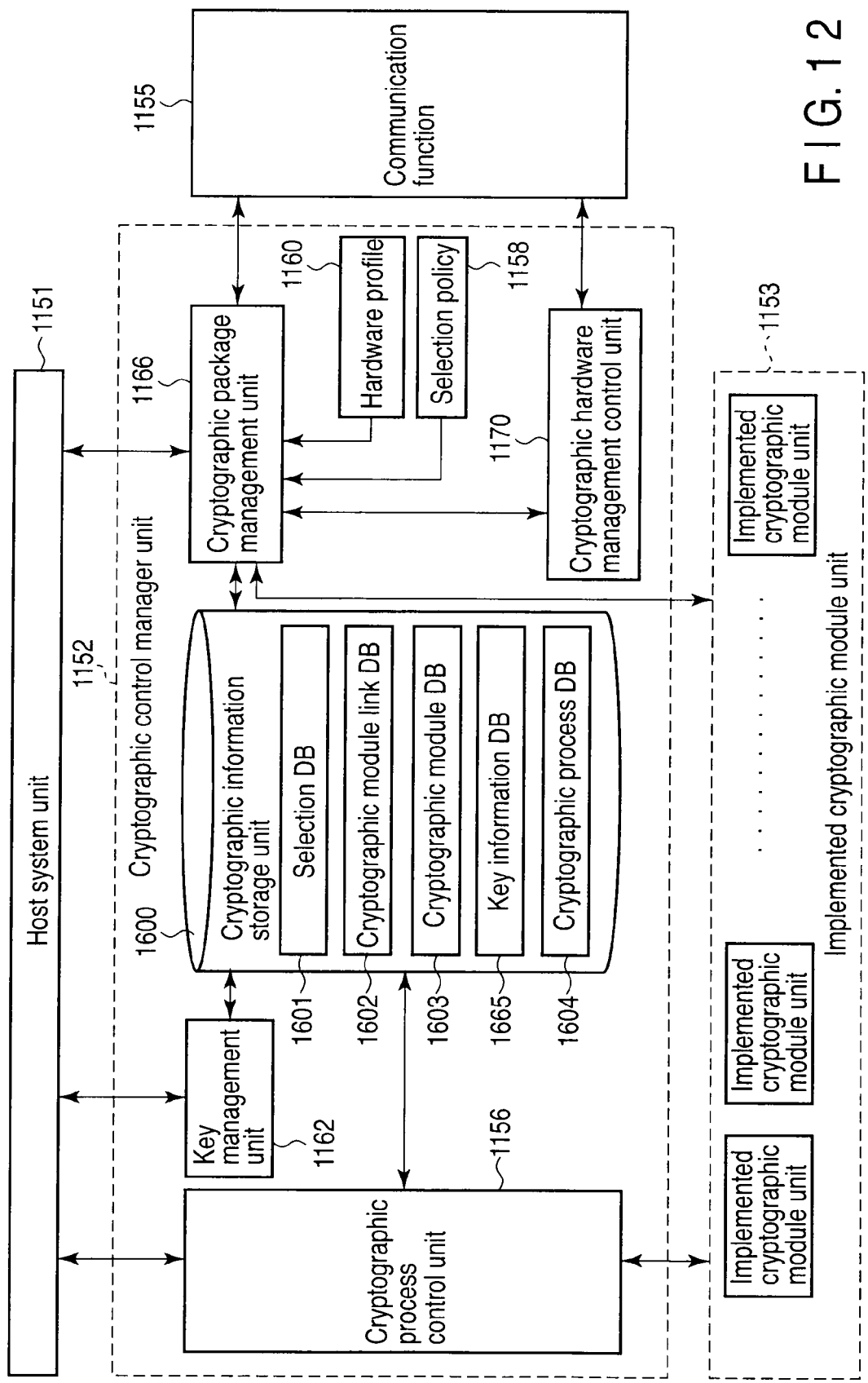
FIG. 12 is a block diagram showing a configuration of a cryptographic client device according to the second embodiment of the invention.

FIG. 12 is a block diagram showing configuration of cryptographic client device 1100. The cryptographic client device 1100 includes a host system unit 1151, a cryptographic control manager unit 1152, an implemented cryptographic module unit 1153, and a communication function unit 1155. A selection policy 1158 is a file setting the priority information about security, processing speed, and resources. The host system unit 1151 and the implemented cryptographic module unit 1153 are the same in configuration and function as in the first embodiment.

The cryptographic control manager unit 1152 includes a cryptographic process control unit 1156, a key management unit 1162, a cryptographic information storage unit 1600, a cryptographic package management unit 1166, and a cryptographic hardware management control unit 1170.

The cryptographic process control unit 1156 has a function of accepting the cryptographic process control request including the cryptographic process condition from the host system unit 1151, a function of specifying the implemented cryptographic module unit 1153 linked with the cryptographic process condition by referring to the cryptographic information storage unit 1600, a function of requesting the cryptographic process to the implemented cryptographic module unit 153 according to the cryptographic process execution timing, a function of issuing the cryptographic process ID to this cryptographic process and storing the cryptographic process ID in the cryptographic information storage unit 1600 by relating the cryptographic process ID with the information about the corresponding cryptographic process, and a function of issuing the cryptographic process result from the implemented cryptographic module unit 1153 and the cryptographic process ID relating to this cryptographic process to the host system unit 1151.

The key management unit 1162 has a function of registering, deleting, acquiring, searching or updating key information in the key information DB 1165 in the cryptographic information storage unit 1600 according to the request from the host system unit 1151, a function of issuing a key ID when registration of key information is normally executed, and storing the key ID in the cryptographic information storage unit 1600 by relating the key ID with the information about this registration process, and a function of issuing each processing result to the host system unit 1151 by including the cryptographic process ID or key ID if necessary.

The cryptographic information storage unit 1600 has a function of storing a selection DB 1601, a cryptographic module link DB 1602, a cryptographic module DB 1603, a key information DB 1165, and a cryptographic process DB 1604. The cryptographic information storage unit 1600 may also have a function of controlling and managing each DB included the cryptographic information storage unit 1600, according to the request from key management unit 1162, cryptographic process control unit 1156, and cryptographic package management unit 1166.

Figure 18:
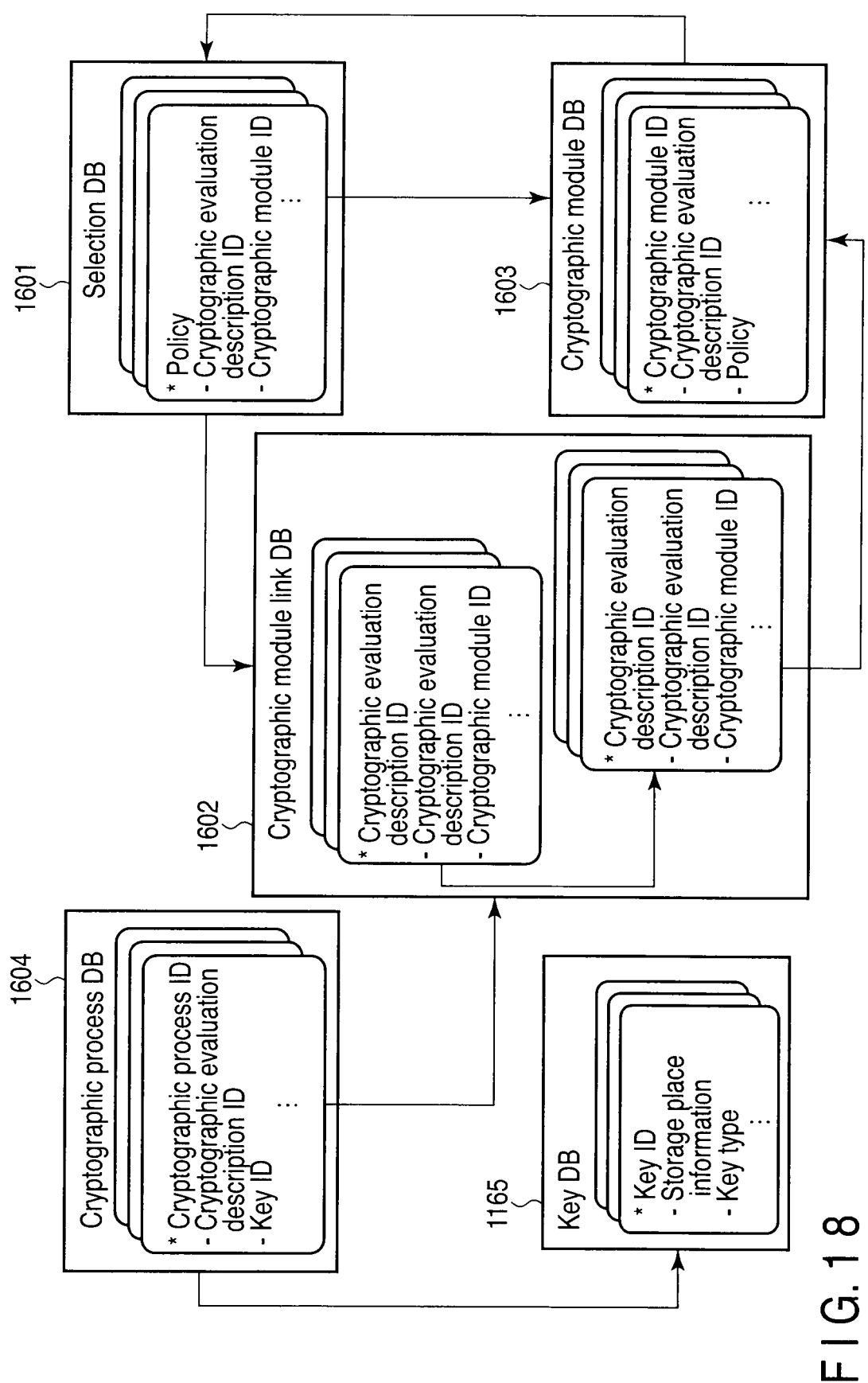
FIG. 18 is a diagram showing a logical configuration of database according to the second embodiment of the invention.

The data structure of selection DB 1601 is as shown in FIG. 13. The data structure of cryptographic module link DB 1602 is as shown in FIG. 14. The data structure of cryptographic module DB 1603 is as shown in FIG. 15. The data structure of key information DB 1165 is as shown in FIG. 16. The data structure of cryptographic process DB 1604 is as shown in FIG. 17. FIG. 18 shows the logical relation of each database of the cryptographic information storage unit 1600.

The cryptographic package management unit 1166 has the following functions.

First, the cryptographic package management unit 1166 has a function of registering the algorithm ID of selected cryptographic package 307, cryptographic module evaluation description ID, cryptographic module ID, and recommended key length information, obtained by transmitting the information including the selection condition, selection policy and hardware profile entered from the hosts system unit 1151 to the cryptographic management server device 1350 by way of the communication function unit 1155, in the cryptographic information storage unit 1600.

Further, the cryptographic package management unit 1166 has a function of specifying the selection DB 1601 on the basis of the selection condition entered from the host system unit 1151, and specifying the algorithm ID of a corresponding key generation engine from the cryptographic algorithm.

The cryptographic package management unit 1166 also has a function of registering the algorithm ID, cryptographic module evaluation description ID, and cryptographic module ID of the key generation engine selected by the cryptographic management server device 1350, in the cryptographic information storage unit 1600.

Moreover, the cryptographic package management unit 1166 also has a function of executing the cryptographic package initial registration protocol by receiving the final initial registration date and final initial registration domain on the cryptographic management server device 1350 by way of the communication function unit 1155 on the basis of the request entered from the host system unit 1151, and downloading the minimum required limit of cryptographic packages 307 from the cryptographic management server device 1350, and registering this in the cryptographic information storage unit 1600.

The cryptographic package management unit 1166 has a further function of transmitting the information including the selection condition, selection policy, hardware profile, and list of cryptographic packages 307 held in the terminal to the cryptographic management server device 1350 by way of the communication function unit 1155, and acquiring the entity of the cryptographic packages 307 selected by the cryptographic management server device 1350 and collateral information (algorithm ID, cryptographic module evaluation description ID, cryptographic module ID), and registering the above in the cryptographic information storage unit 1600.

The cryptographic package management unit 1166 also has a function of setting the policy of the action executed by the cryptographic control manager 1152 on the occasion of notice destination registration of updating notice or updating event from the cryptographic management server device 1350.

The cryptographic package management unit 1166 also has a function of executing the updating process about entity of cryptographic package 307 held in the cryptographic control manager unit 1152 cooperating with the cryptographic management server device 1350 by way of the communication function unit 1155 on the basis of the content requested from the host system unit 1151 and the latest updating notice identifier held in the cryptographic control manager unit 1152 and the selection policy of the cryptographic package 307 and the combination of cryptographic package 307.

The cryptographic package management unit 1166 also has a function of deleting the entity of the cryptographic package 307 requested from the host system unit 1151 from the cryptographic information storage unit 1600, and canceling the relationship of each database including the cryptographic information storage unit 1600 linked to the cryptographic package 307.

The cryptographic package management unit 1166 also has a function of transmitting the information including the transfer destination domain information entered from the host system unit 1151, hardware profile, and list of cryptographic packages 307 held in the device, to the cryptographic management server device 1350 by way of the communication function unit 1155, and acquiring the cryptographic package information controlled of external distribution selected by the cryptographic management server device 1350, and deleting the concerned cryptographic packages 307 held in the cryptographic client device 1100.

The cryptographic hardware management control unit 1170 has a function of controlling communication with the cryptographic hardware by way of communication function unit 1155 depending on the request from each part of the cryptographic control manager unit 1152.

The communication function unit 1155 is a function for realizing mutual communication between the cryptographic package control management unit 1166 and hardware management control unit 1170 or between the partner communication device and cryptographic hardware.

Figure 19:
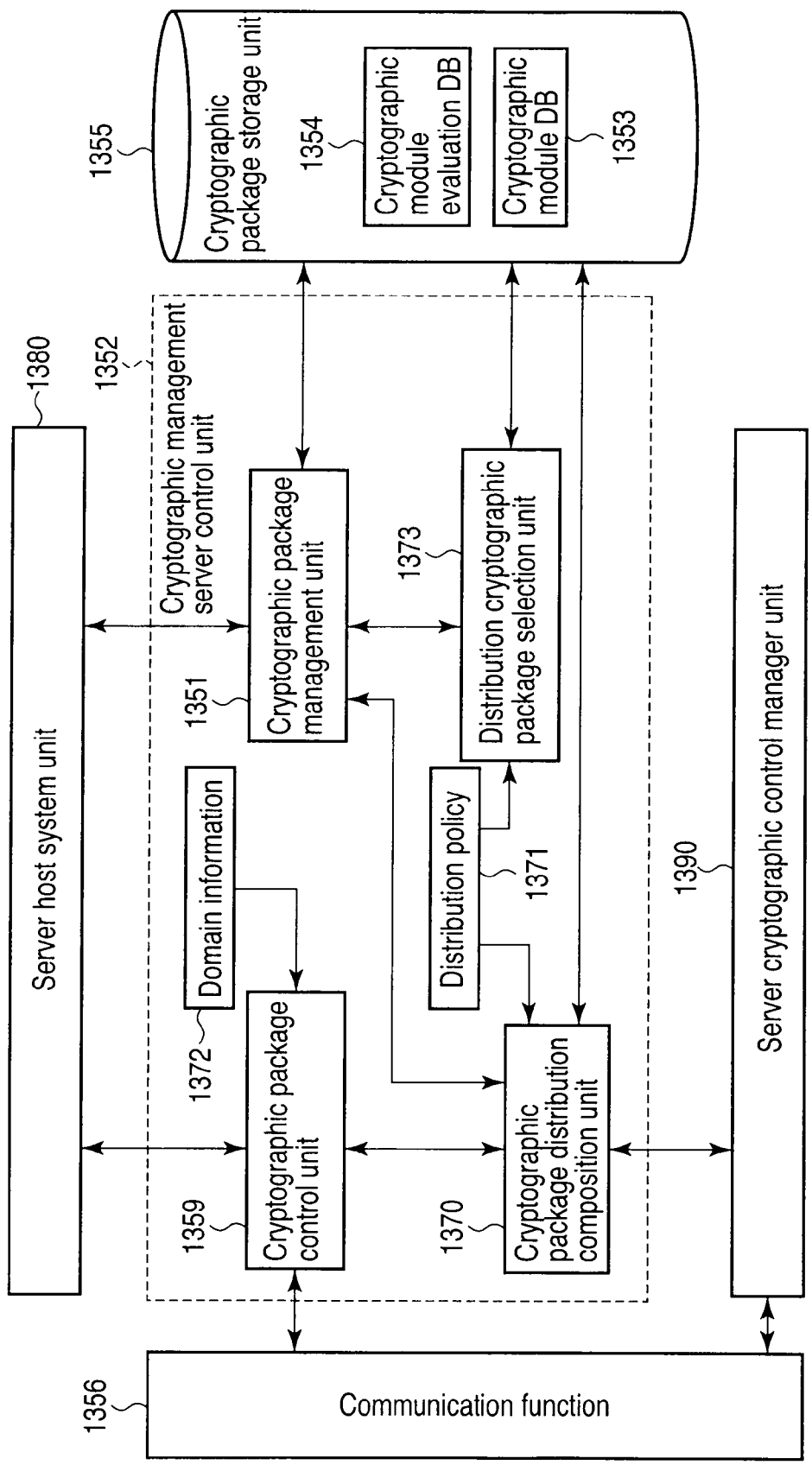
FIG. 19 is a block diagram showing a configuration of a cryptographic management server device according to the second embodiment of the invention.

FIG. 19 is a functional block diagram showing a configuration of cryptographic management server device 1350. The cryptographic management server device 1350 includes a server host system 1380, a communication function 1380, a server host system 1380, a communication function unit 1356, a cryptographic management server control unit 1352, a cryptographic package storage unit 1355, and a server cryptographic control manager unit 1390.

The server host system 1380 has the same functions as the server host system 1380 of the cryptographic client device 1100, and also has a function of transmitting the control request from the system managing person responsible for about cryptographic management to the cryptographic management server control unit 1352.

The communication function unit 1356 has a function of mutual communication among the cryptographic management server control unit 1352, server management control manager unit 1390, partner communication device, cryptographic hardware, and simulator simulating the operation of cryptographic hardware.

The cryptographic management server control unit 1352 includes a cryptographic package control unit 1359, a cryptographic package management unit 1351, a cryptographic package distribution composition unit 1370, and a distribution cryptographic package selection unit 1373.

The cryptographic package control unit 1359 has a function of registering the cryptographic package 307 by request from the server host system unit 1380, a function of updating the already registered cryptographic package by request from the server host system unit 1380, a function of verifying the vendor authenticator for confirming the source of the corresponding cryptographic package when providing the cryptographic package from the vendor, a function of generating a complex type cryptographic module evaluation description unit by combining a plurality of single type cryptographic module evaluation description units or a plurality of double type cryptographic module evaluation description units, a function of searching the cryptographic packages 307 registered in the cryptographic module DB 1355 and acquiring a list, a function of deleting the cryptographic module 308 and related cryptographic package 307 from the cryptographic module DB 1355 by request from the server host system unit 1380, and a function of issuing a log regarding registration, updating, and deleting on the cryptographic package storage unit 1355.

The cryptographic package management unit 1351 has a function of processing the control requests from a plurality of cryptographic client devices 1100 in parallel simultaneously, a function of initial registration process, distribution process, updating process, selecting process, updating notice process, and cryptographic management domain transfer process of cryptographic package 307, a function of establishing a security-protected communication path between the cryptographic client device 1100 and the cryptographic management server device 1350, a function of managing the status of the cryptographic client management device existing in the domain managed by the corresponding cryptographic management server device 1350, and a function of generating a log of an initial registration process, distribution process, updating process, selecting process, updating notice process, and cryptographic management domain transfer process of cryptographic package 307.

The cryptographic package distribution composition unit 1370 has a function of acquiring the cryptographic package 307 selected by the distribution cryptographic package selection unit 1373 from the cryptographic module DB 1355, a function of composing data of description items stored in the cryptographic module DB 1355 and issuing such data in a cryptographic module evaluation description format XML, a function of generating a key by requesting the process to the server cryptographic control manager unit 1390 depending on the specified security method of the key used in security communication in cryptographic package control unit 1359, a function of managing the information of the key on the basis of the information including the ID, key, and security method of the cryptographic client device 1100, and a function of security processing of data confidentiality and data verification of the information to be transmitted from the cryptographic management server device 1350 to the cryptographic client device 1100 depending on the security level, and a security method defined in the distribution policy of the cryptographic management server device 1350.

The distribution cryptographic package selection unit 1373 has a function of initial registration judgment, selection of cryptographic method, and selection of cryptographic package in an initial registration process of a cryptographic package, a function of judging the distribution and selecting the cryptographic package in distribution process of cryptographic package, a function of acquiring an updated cryptographic module list and selecting a cryptographic package in an updating process of a cryptographic package, a function of judging the selection and selecting a cryptographic package in selection process of cryptographic package, a function of judging the move and generating the domain move process information in a cryptographic management domain transfer process, and a function of searching the cryptographic package satisfying the selection condition, selection policy, and hardware policy from the cryptographic package storage unit.

The cryptographic module DB 1355 has a cryptographic module DB 1353 for recording and managing the registered cryptographic module 308, and a cryptographic module evaluation DB 1354 for recording and managing the cryptographic evaluation description file 309.

The server cryptographic control manager unit 1390 has the same functions as the cryptographic control manager unit 1152 of the cryptographic client device 1100, and also has a function of cryptographic asset management control and cryptographic verified communication in the cryptographic management server device 1350 by cooperating with the cryptographic management server control unit 1352.

Figure 20:
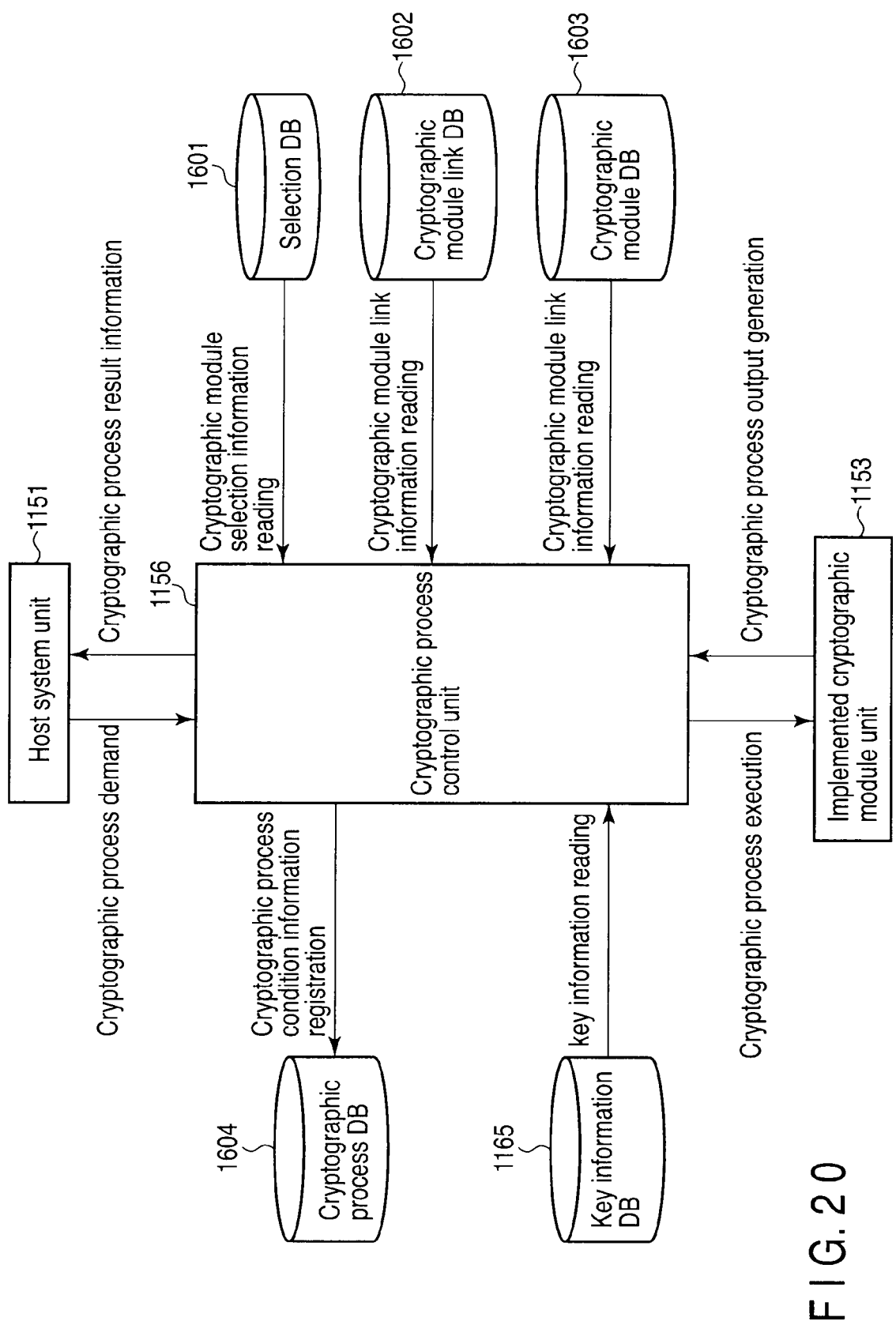
FIG. 20 is a diagram showing a cryptographic process operation example of a cryptographic client device according to the second embodiment of the invention.
Figure 21:
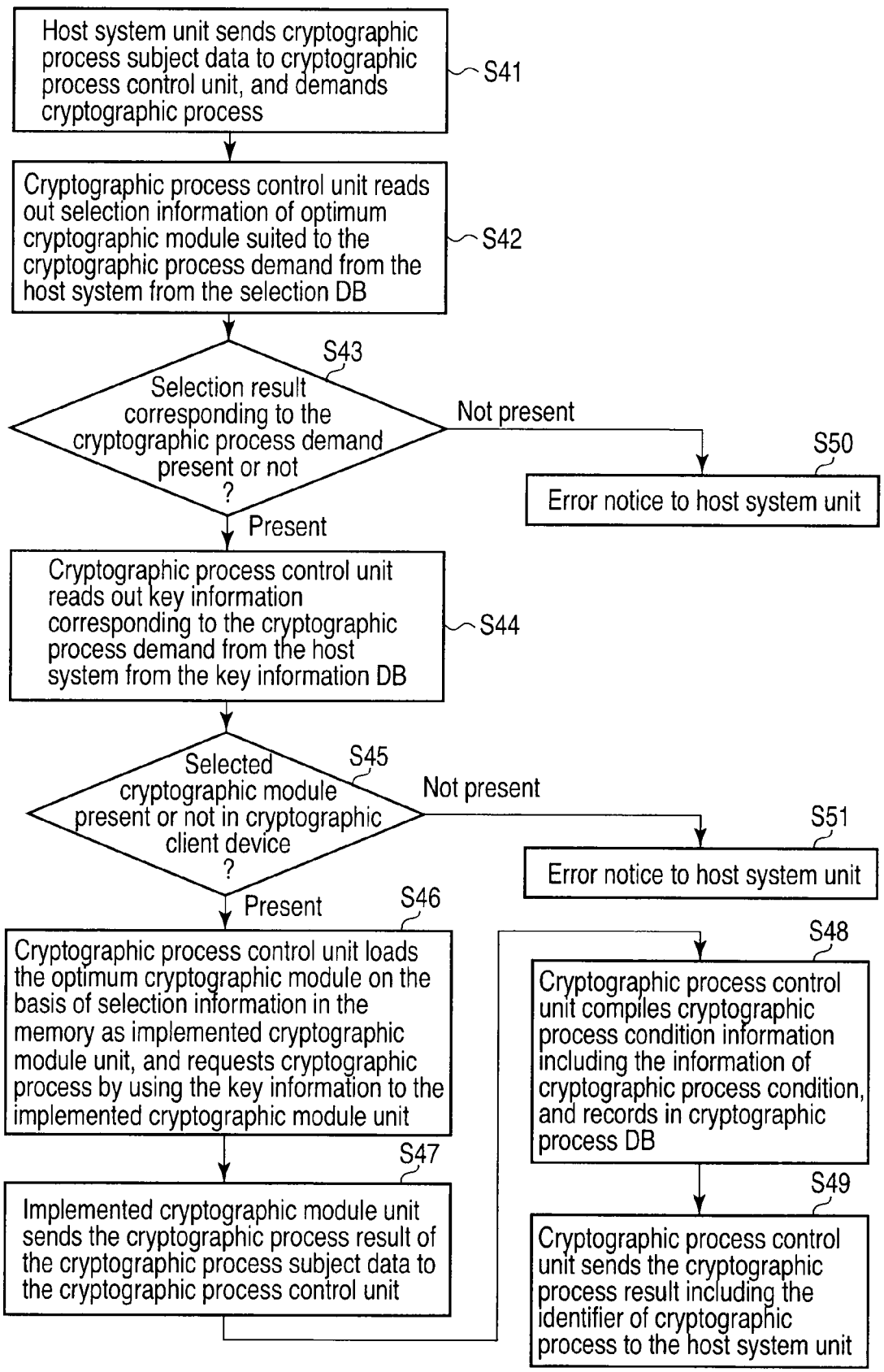
FIG. 21 is a diagram showing a cryptographic process flow example of a cryptographic client device according to the second embodiment of the invention.

In the second embodiment, in response to the cryptographic process request from the host system unit 1151 in the cryptographic client device 1100, the cryptographic process control unit 1156 operates the cryptographic process by searching for an optimum cryptographic module, executing the cryptographic process, and issuing the cryptographic process result to the host system unit 1151. FIG. 20 is a diagram of a cryptographic process example of the cryptographic client device. FIG. 21 is a diagram of a cryptographic process flow example of the cryptographic client device.

In the second embodiment, the process operation of the cryptographic control manager 1152 and implemented cryptographic module unit 1153 responding to the cryptographic process request from the host system unit 1151 in the cryptographic client device 1100 is explained below. The host system unit 1151 requests a cryptographic process to the cryptographic process control unit 1156 by receiving the cryptographic process request information including the data to be performed the cryptographic process and the category identifier of the cryptographic process (step S41).

The cryptographic process control unit 1156 reads out an optimum cryptographic module suited to the cryptographic process request from the host system unit 1151 from the selection DB 1601 (step S42). At this time, if selection information of the optimum cryptographic module suited to the cryptographic process request is not found in the selection DB, an error is issued to the host system unit, and the process is terminated (step S43, step S50). When the selection information of the optimum cryptographic module is found, the cryptographic process control unit 1156 reads out the key information corresponding to the cryptographic process request from the host system unit 1151 from the key information DB 1165 (step S44).

If the selected cryptographic module is not present in the corresponding cryptographic client device 1100, an error is issued to the host system unit 1151, and the process is terminated (step S45, step S51). When the selected cryptographic module is present in the corresponding cryptographic client device 1100, the cryptographic process control unit 1156 reads out the cryptographic module link information and cryptographic module information from the cryptographic module link DB and cryptographic module DB, and loads the corresponding cryptographic module in the memory as implemented cryptographic module unit 1153.

The cryptographic process control unit 1156 enters the above key information and the data to be performed a cryptographic process from the host system unit into the implemented cryptographic module unit 1153, and requests a cryptographic process (step S46). The implemented cryptographic module unit 1153 issues the cryptographic process result of the data to be performed the cryptographic process to the cryptographic process control unit 1156 (step S47). The cryptographic process control unit 1156 generates cryptographic process condition information including the identifier of cryptographic process, and records such information in the cryptographic process DB 1604 (step S48). The cryptographic process control unit 1156 issues the cryptographic process result information including the cryptographic process ID and encrypted data to the host system unit 1151 (step S49).

At step S43, if selection information of the optimum cryptographic module suited to the cryptographic process request is not present in the selection DB, without issuing an error to the host system unit, the selection result information may be downloaded by requesting selection of the optimum cryptographic module to the cryptographic management server device 1350. If the cryptographic module described in the selection result information is not present in the corresponding cryptographic client device 1100, without issuing an error to the host system unit, the corresponding cryptographic module may be downloaded from the cryptographic management server device 1350 into the corresponding cryptographic client device 1100.

Figure 22:
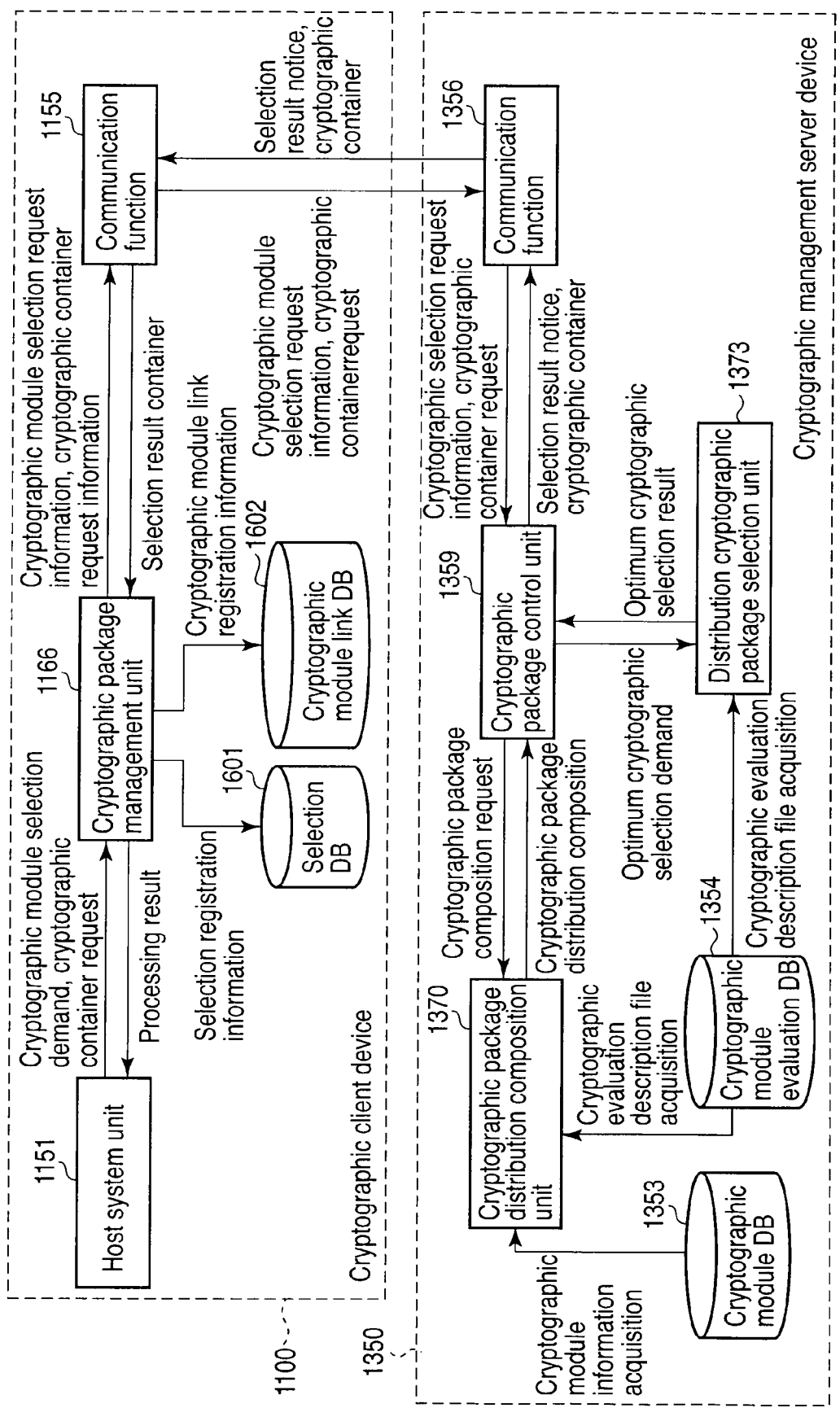
FIG. 22 is a diagram showing an enquiry process of optimum cryptography according to the second embodiment of the invention.
Figure 23:
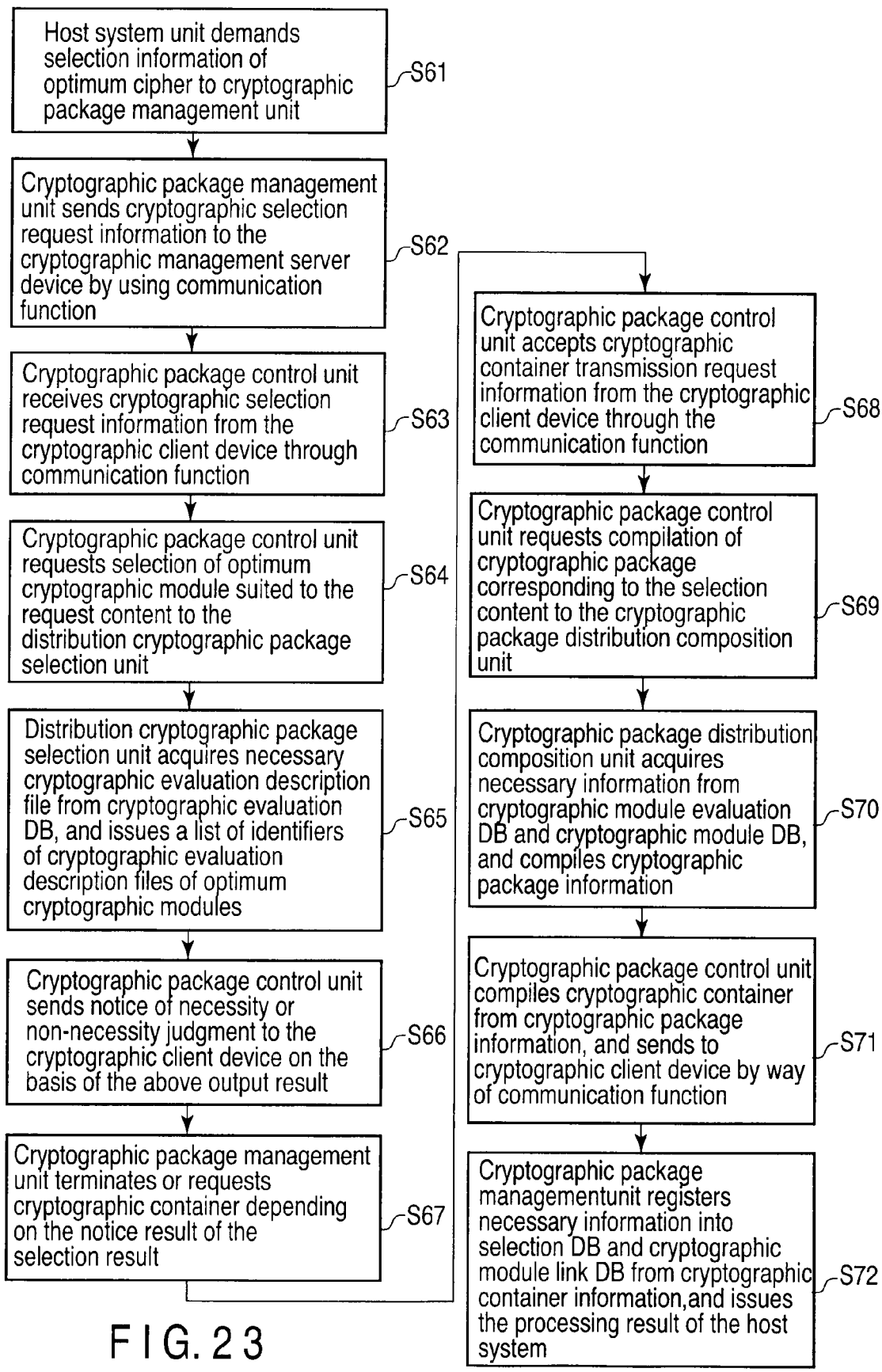
FIG. 23 is a diagram showing an enquiry process flow example of optimum cryptography according to the second embodiment of the invention.

If selection information of the optimum cryptographic module suited to the corresponding process request is not present in the selection DB, the cryptographic client device 1100 may register the information linking the host system request and optimum cryptography in the relation DB as follows. As a result, connection to the cryptographic management server device 1350 is not needed in selection of optimum cryptography suited do the same cryptographic process request from the host system. An inquiry process of optimum cryptography is shown in FIG. 22. An inquiry process flow example of the optimum cryptography is shown in FIG. 23.

The host system unit 1151 requests selection of the optimum cryptographic module suited to the selection condition including the identification information of category to the cryptographic package management unit 1166 (step S61). The cryptographic package management unit 1166 demands cryptographic module selection to the cryptographic management server device 1350 by using the communication function unit 1155 on the basis of the cryptographic module select request information from the host system unit 1151 (step S62). The cryptographic module select demand includes, for example, an identifier of category, a cryptographic module selection policy of cryptographic client device 1100, and information about a hardware profile.

The cryptographic package control unit 1351 receives a cryptographic module select demand request from the cryptographic client device 1100 through the communication function unit 1356 (step S63). The cryptographic package control unit 1351 enters the identifier of category, hardware profile, and selection policy information included in the cryptographic module select demand request into the distribution cryptographic package selection unit 1373, and requests selection of a cryptographic package conforming to the condition (step S64).

The distribution cryptographic package selection unit 1373 acquires the necessary cryptographic evaluation description file from the cryptographic module evaluation DB 1354, executes selection of a cryptographic package suited to the condition, and issues a list of identifiers of selected cryptographic evaluation description files (step S65). The cryptographic package control unit 1351 notifies of the end when the number of issued cryptographic evaluation description files is zero, or sends a request for transmission or no transmission of a cryptographic container depending on the selection result if not zero, to the cryptographic client device 1100 through the communication function unit 1356 (step S66).

The cryptographic package management unit 1166 demands end of process depending on the selection result notice or transmission request of the cryptographic container depending on the selection result from the cryptographic management server device 1350 (step S67). The cryptographic package control unit 1351 receives the transmission request of the cryptographic container from the cryptographic client device 1100 through the communication function unit 1356, and continues to the next process (step S68). The cryptographic package control unit 1351 receives the identifier of the cryptographic evaluation description file selected at step S65, and transmits a compilation of the intended cryptographic package to the cryptographic package distribution composition unit 1370 (step S69).

The cryptographic package distribution composition unit 1370 acquires necessary information from the cryptographic module evaluation DB 1354 and cryptographic module DB 1353 and compiles the cryptographic package information, and issues such information to the cryptographic package control unit 1351 (step S70). The cryptographic package control unit 1351 compiles a cryptographic container with security protection depending on the communication security level from the cryptographic package information, and transmits the cryptographic container to the cryptographic client device 1100 by way of the communication function unit 1356 (step S71). The cryptographic package management unit 1166 cancels the security protection or verifies the validity depending on the security level from the cryptographic container information, registers necessary information in the selection DB 1601 and the cryptographic module link DB 1602, and issues the process result to the host system (step S72).

Figure 24:
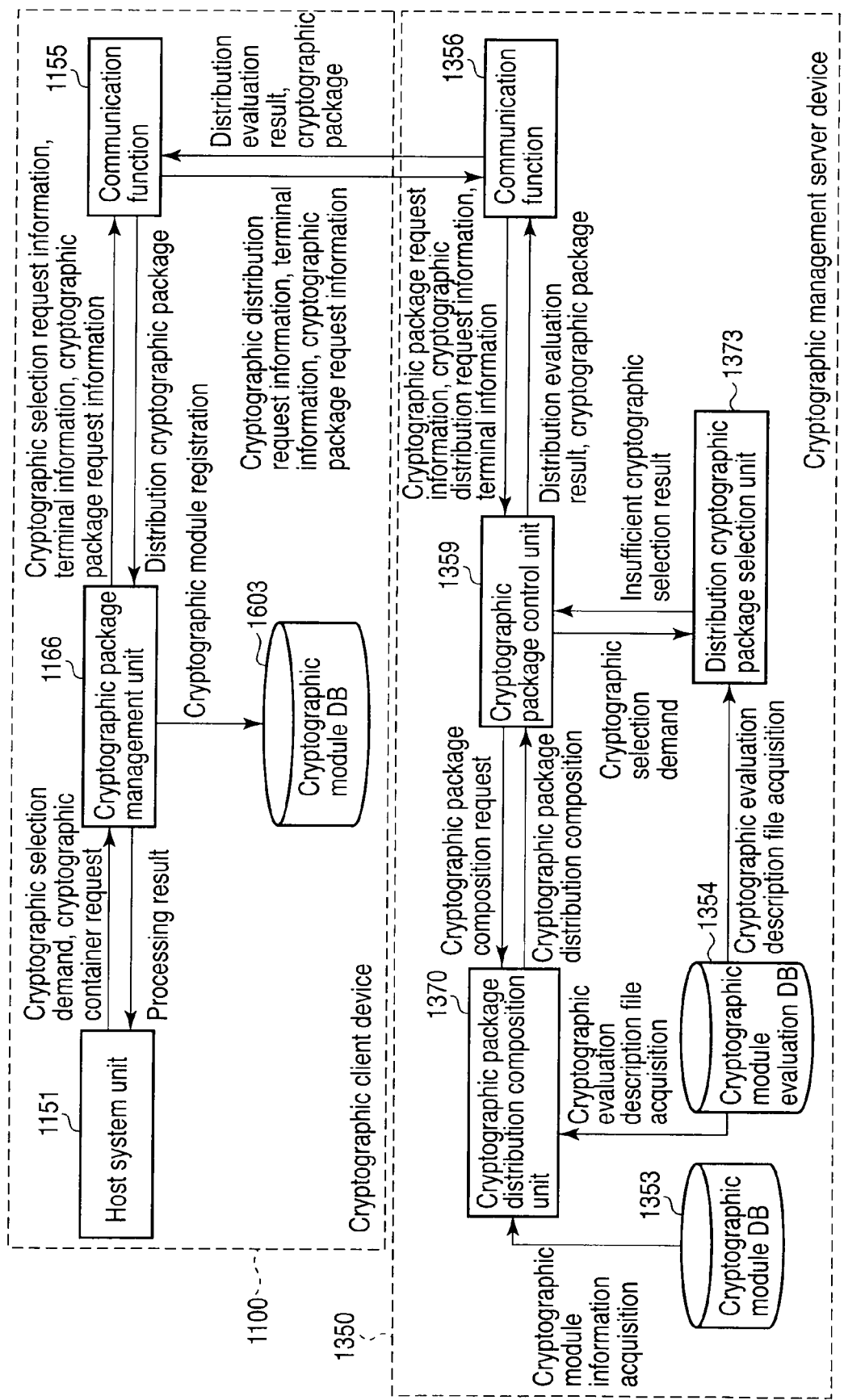
FIG. 24 is a diagram showing a distribution process of a cryptographic module according to the second embodiment of the invention.
Figure 25:
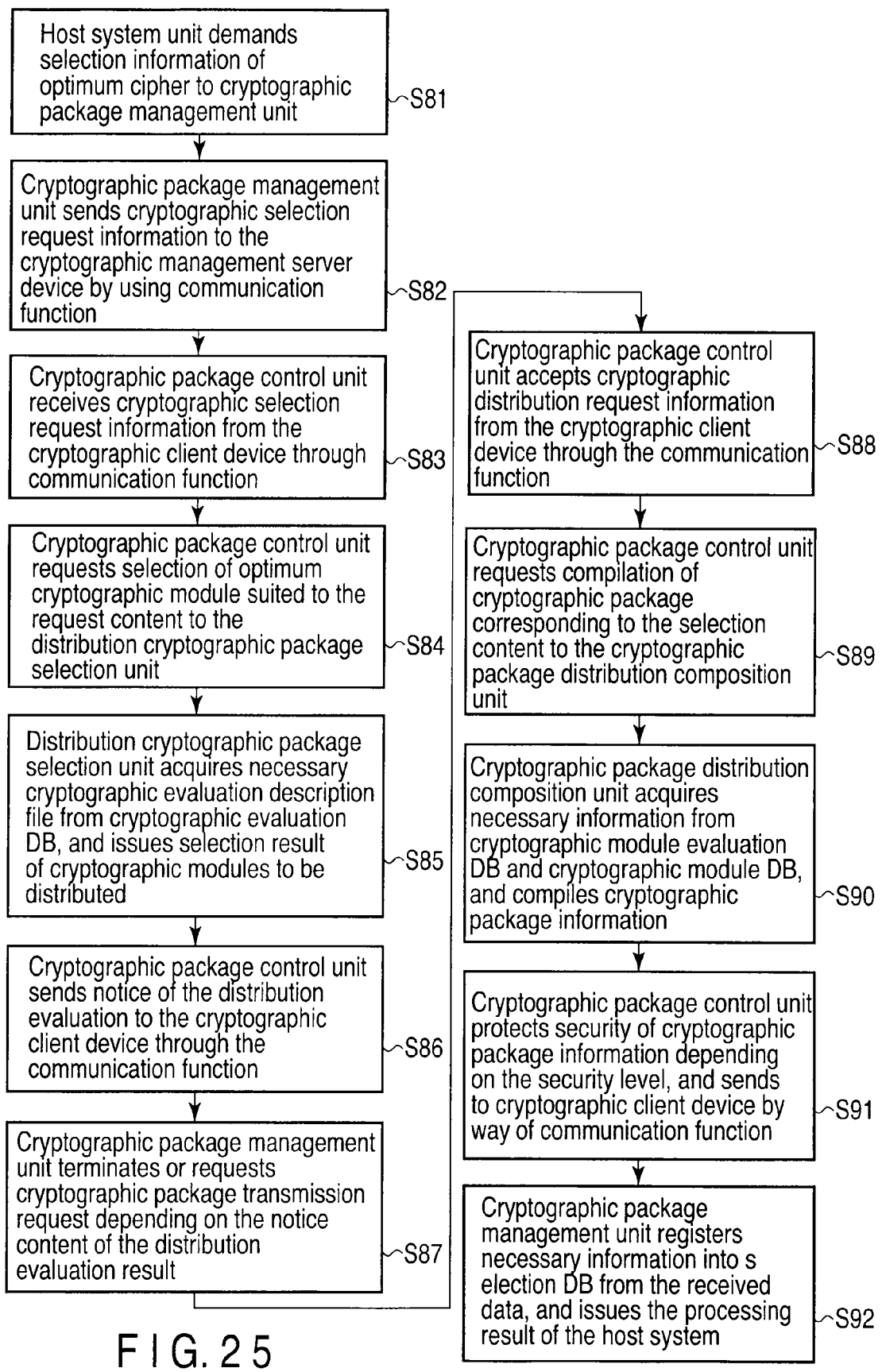
FIG. 25 is a diagram showing a distribution process flow example of a cryptographic module according to the second embodiment of the invention.

If an optimum a cryptographic module is not present in the cryptographic client device 1100, including after registration of the selection result into the DB 1601 and cryptographic module link DB 1602, the intended cryptographic module is downloaded from the cryptographic management server device 1350 in the cryptographic module distribution process as follows. The distribution operation of the cryptographic module is shown in FIG. 24. A flow example of a distribution process is shown in FIG. 25.

The host system unit 1151 receives the information including the identifier of the cryptographic algorithm, and requests a distribution demand of the cryptographic module to the cryptographic package management unit 1166 (step S81). The cryptographic package management unit 1166 demands cryptographic module selection to the cryptographic management server device 1350 by using the communication function unit 1155 on the basis of cryptographic package distribution request information from the host system unit 1151 (step S82).

The cryptographic module distribution request includes the information about, for example, an identifier of a cryptographic algorithm, a cryptographic module selection policy of cryptographic client device 1100, and a hardware profile. The cryptographic package control unit 1351 receives a cryptographic module distribution demand request from the cryptographic client device 1100 through the communication function unit 1356 (step S83). The cryptographic package control unit 1351 enters the identifier of a cryptographic algorithm, hardware profile, and selection policy information included in the cryptographic module distribution demand request into the distribution cryptographic package selection unit 1373, and requests selection of a cryptographic package conforming to the distribution demand (step S84).

The distribution cryptographic package selection unit 1373 acquires the necessary cryptographic evaluation description file from the cryptographic module evaluation DB 1354 on the basis of distribution demand request information including the hardware profile of the cryptographic client device 1100 and selection policy, and executes selection of a cryptographic package suited to the condition, and issues a list of identifiers of a selected cryptographic evaluation description file (step S85)

The cryptographic package control unit 1351 notifies of the end when the number of issued cryptographic evaluation description files is zero, or sends a request for transmission or no transmission of cryptographic package corresponding to the result of distribution evaluation if not zero, to the cryptographic client device 1100 by using the communication function unit 1356 (step S86). The cryptographic package management unit 1166 processes the end or requests a transmission request of a cryptographic container according to the selection result, depending on the notice of distribution evaluation result from the cryptographic management server device 1350 (step S87).

The cryptographic package control unit 1351 receives the transmission request of a cryptographic package from the cryptographic client device 1100 through the communication function unit 1356, and continues to the next process (step S88). The cryptographic package control unit 1351 receives the identifier of the cryptographic evaluation description file selected at step S85, and sends a compilation request of the intended cryptographic package to the cryptographic package distribution composition unit 1370 (step S89).

The cryptographic package distribution composition unit 1370 acquires the necessary information from the cryptographic module evaluation DB 1354 and cryptographic module DB 1353, and compiles cryptographic package information, and issues this information to the cryptographic package control unit 1351 (step S90). The cryptographic package control unit 1351 compiles security-protected cryptographic package information depending on the communication security level from this cryptographic package information, and transmits this information to the cryptographic client device 1100 by way of communication function unit 1356 (step S91).

The security protection process is realized, for example, by adding a MAC to the cryptographic package, or encrypting and transmitting the cryptographic package and utilizing the proxy decrypting function of the cryptographic hardware 450. The cryptographic package management unit 1166 cancels security protection or verifies validity depending on the security level from the cryptographic package information, registers the necessary information in the cryptographic module DB 1603, and issues the process result to the host system (step S92).

The cryptographic container is a distribution data sequence including the data of security-protected encryption contents and header information, such as the information and cryptographic module relating to the cryptographic evaluation description file to be sent to the cryptographic client device 1100 from the cryptographic management server device 1350. The security protection process includes encryption of encryption contents, addition of a MAC (message authentication code) to the header information and encryption contents, and addition of a MAC to the header information and encrypted encryption contents. Otherwise, without the security protection process, the header information may be added directly to the encryption contents.

The cryptographic key to be used in the security protection process may be stored, or the security protection process may be executed by the cryptographic hardware 450. For example, the cryptographic hardware management control unit 1170 enters the encrypted encryption data into the cryptographic hardware 450, and the decrypted encryption contents issued by execution of decryption process in the cryptographic hardware 450 may be acquired and implemented. The header information of a cryptographic container includes, for example, type of encryption contents, number of cryptographic modules to be transmitted, and the transmission data size.

Third Embodiment

In the system described above, if a weakness is found in the software module to be used at the terminal side, another software module is provided until a substitute software module is completed, and such system is explained below.

In the third embodiment, updating of cryptographic module 308 or cryptographic package 307 executed in the first embodiment and third embodiment may be processed more safely. In this embodiment, the subject of updating is not limited to the cryptographic package 307 alone, and it can be applied in updating of all software modules. That is, in the computing device, if a weakness such as vulnerability is found in the software module being executed or utilized, as long as a corrected module solving the weakness is distributed and provided, the software module is not limited to the cryptographic module 308 or the like.

In the third embodiment, in the function of selecting the software module to be used, a software module of higher qualification than the software module having the weakness is distributed together with the evaluation index. As a result, while concealing which software module has the weakness, by stopping the use of the software module, attack by using the weakness can be prevented.

Figure 26:
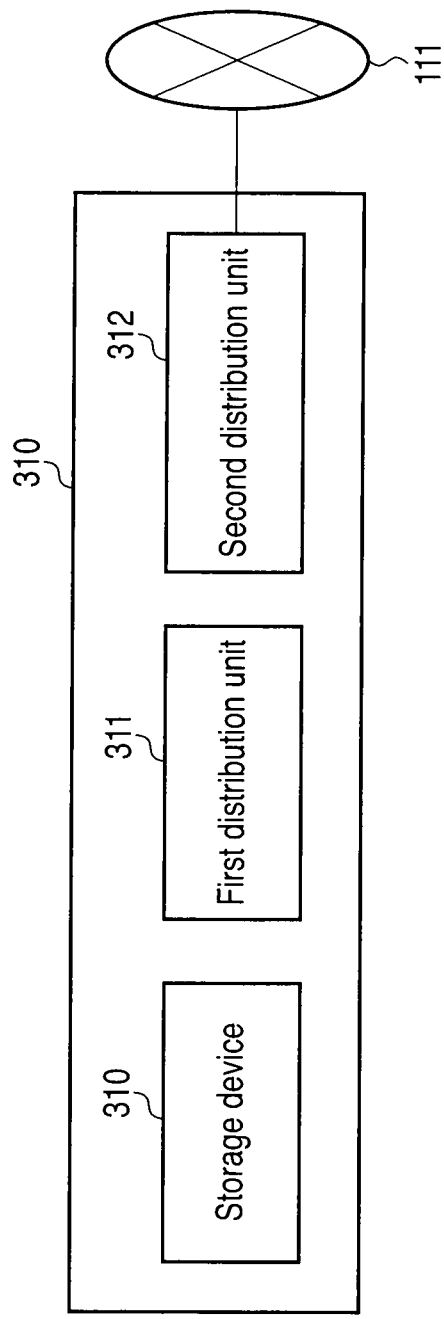
FIG. 26 is a block diagram showing a configuration of a software module management device in a third embodiment of the invention.

FIG. 26 is a diagram showing a configuration of software module management device 301 in the third embodiment. The software module management device 301 includes a storage unit 310, a first distribution unit 311, and a second distribution unit 312.

The storage unit 310 stores, for example, software module A, software module B having same function as the software module B, and the corresponding evaluation index.

The first distribution unit 311 transmits a substitute module of the corresponding software module to the computing device 100 using the software module, when a weakness is found in the software module, and changes over the software module of the computing device 100.

The second distribution unit 312 transmits a corrected version of the software module having the weakness to the computing device 100 using the substitute module, for example, and changes over the software modules of the computing device 100.

A schematic configuration of the function module of the computing device 100 is shown in FIG. 27. The computing device 100 includes a central processing unit 101, a storage unit 102, an operating system module 103, module selection module 104, an updatable software module 105, a network connection unit 106, and a module selection policy storage unit 110, and they are connected by logical buses 107. The updatable software module 105 expresses a plurality of software modules. The network connection unit 106 is connected to a network 108. The module selection module 104 refers to the basis of selection stored in the module selection policy storage unit 110, and selects an appropriate software module 105 suited to the intended application. The basis of selection is the information specifying, for example, the lower limit and upper limit of one or more items such as the quantity of resources to be used and the processing speed.

The module selection module 104 reads out the basis of selection information from the module selection policy storage unit 110, and compares the basis of selection information and the evaluation index contained in the updatable software module 203, and detects an executable software module 201 corresponding to the evaluation index satisfying the condition of the basis of selection information.

A schematic configuration of the distributed updatable software module is shown in FIG. 28. The updatable software module 203 is composed of an executable software module 201 and an evaluation index 202. The evaluation index 202 is the information storing the evaluation information of the corresponding software module 201, and is, for example, a data file expressing the evaluation information in XML format. The evaluation index 202 contains indices to be used in evaluation, such as quantity of usable resources 211, processing speed 212, processing content 213, application 214, and period of use 215. The evaluation index 202 may also contain the identification information of the corresponding executable software module 201.

The quantity of usable resources 211 is the numerical information about, for example, resource information such as the necessary memory amount required for operation of a corresponding executable software module 201. The processing speed 212 is the numerical information about, for example, the amount of computation necessary for operation of corresponding executable software module 201. The processing content 213 is the information showing, for example, the operation process content of the algorithm of the executable software module 201. The application 214 is, for example, the identification information of a category predetermined in a processing application of corresponding executable software module 201. The period of use 215 is, for example, the information showing the guaranteed period of use of corresponding executable software module 201.

These items of information contained in the evaluation index 202 are examples, and the contents are not particularly limited as long as they are usable in evaluation. The evaluation index 202 is used on the basis of the module selection module 104 and the executable software module 201.

Figure 29:
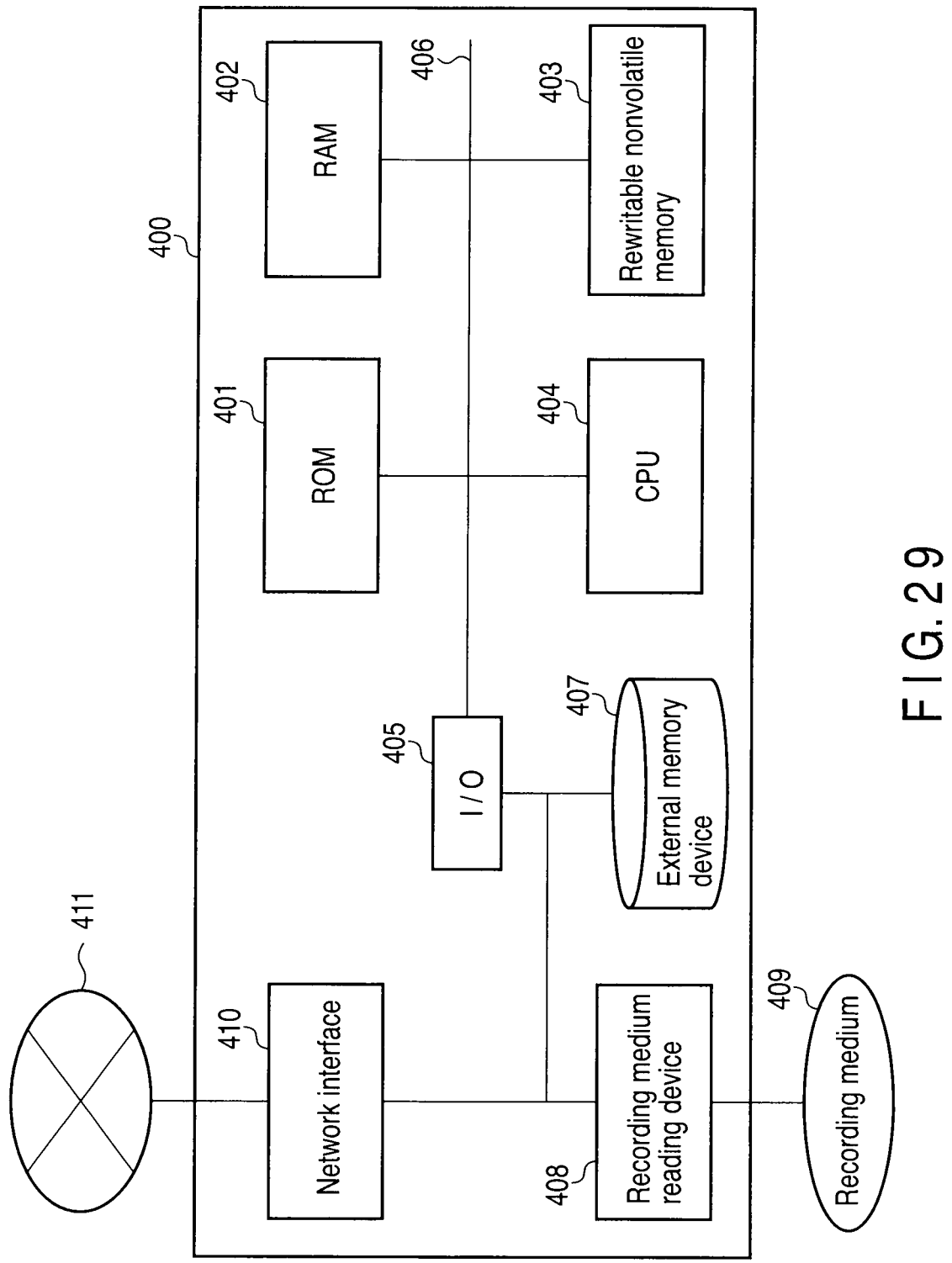
FIG. 29 is a diagram showing a configuration of a computing device according to the third embodiment of the invention.

An example of a representative hardware configuration of the computing device in the third embodiment is shown in FIG. 29. In a computing device 400, a ROM 401, a RAM 402, and a rewritable nonvolatile memory 403 are mutually connected with a CPU 404 through buses 406. The buses 406 are connected to an external storage unit 407, a storage medium reading unit 408, and a network interface 410 by way of I/O 405. A recording medium 409 positioned outside of the computing device can be connected to a network 411 positioned outside of the computing device.

Figure 30:
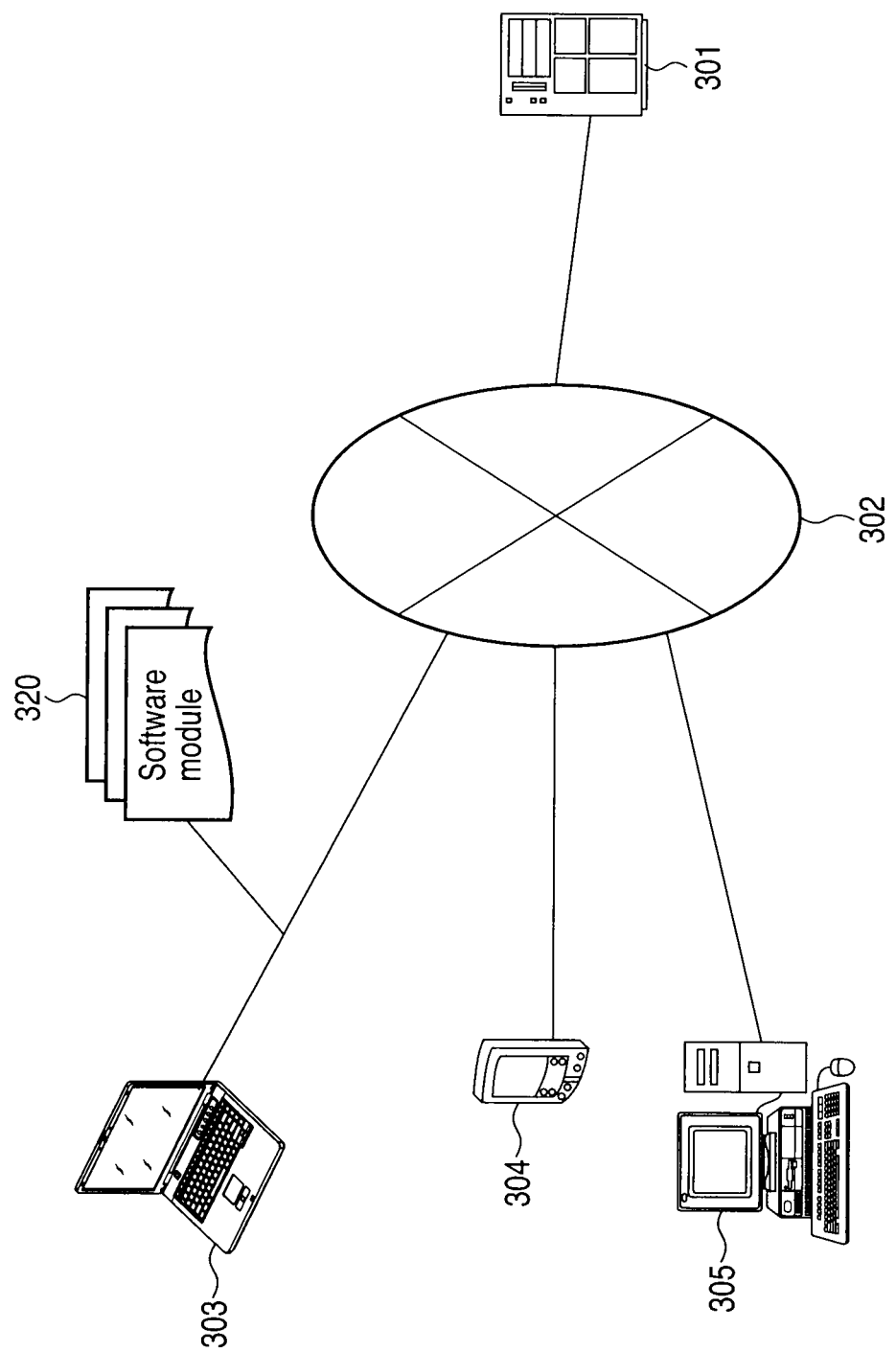
FIG. 30 is a diagram showing a configuration of a security information communication system according to the third embodiment of the invention.

A schematic configuration of distribution of an updatable software module in the third embodiment is shown in FIG. 30. The software module management device 301 distributes software modules 320 to a plurality of computing devices 303, computing device 304, and computing device 305 by way of network 302. The software modules 320 to be distributed through the network 302 may be encrypted or signed, as required, by the prior cryptographic technology such as encryption or a digital signature. In this embodiment, the distributed software modules 320 may be either one or both of the executable software module 201 and evaluation index 202 in FIG. 28.

In the embodiment, an example of distribution through the network 302 is shown, but it is not limited to this example alone. Distribution of software module 320 may be achieved by other means, as easily understood by those skilled in the art, such as storage medium or input device of another form.

Figure 31:
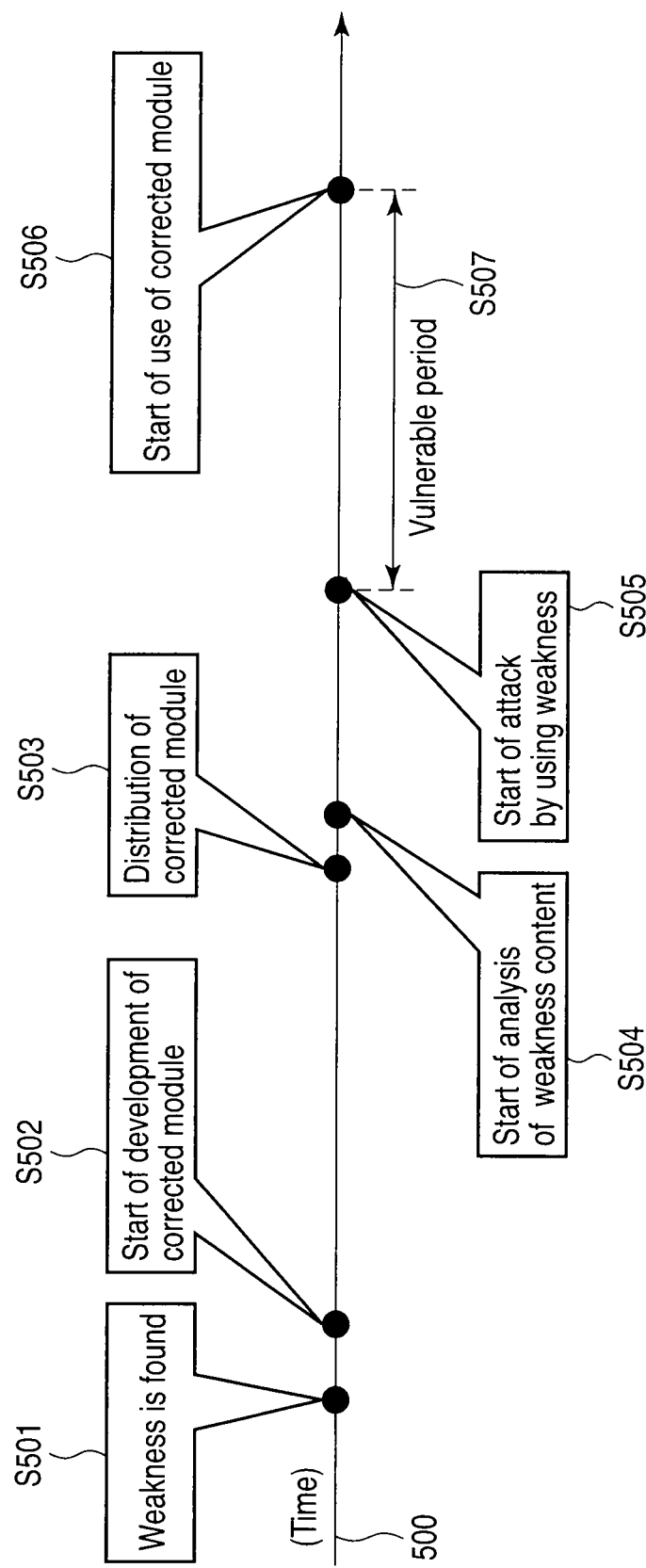
FIG. 31 is a diagram showing a distribution operation example of a correction software module in a prior art.

Prior to explanation of the operation example of the embodiment, an operation example of distribution and start of use of a corrected software module by the prior art is explained in time series in FIG. 31. The time lapse 500 flows from left to right in the diagram. That is, the left end is a past point, and the right end corresponds to a present or future point. At step S501, if a weakness is found in a software module, the development source of this software module starts development of a corrected module at step S502, and starts distribution of the corrected module at step S503. An attacker utilizing the weakness acquires the corrected software module started in distribution at step S503, and starts analysis of the corrected content at step S504. Using the result of analysis, the attacker starts attacking by utilizing the weakness at step S505. In a certain computing system, supposing the use of a corrected module started in distribution at step S503 is started at step S506, a vulnerable period is from step S505 to step S506, and in this period, the content of the correction of a weakness is recognized as a possible means of attack by this vulnerability.

An operation example of distribution of a corrected software module and start of use in the embodiment is shown in time series in FIG. 32. The time lapse 600 flows from left to right in the diagram.

For example, a software module A is included in the updatable software module 105 in the computing device 303, and it is supposed that the executable software module A is being executed. At step S601, if a weakness is found in the software module A, a vendor, that is, the provider of the software module A starts development of software module A', a corrected module of the software module A (step S602).

The first distribution unit 311 of the software module management device 301 starts distribution of software module B preliminarily stored in the storage unit 310, which is a substitute module of the software module A, at step S603 later than step S601. Suppose, herein, the software module B is a module having the same function as the software module A but implementing a different algorithm. That is, the first distribution unit 311 distributes the software module B as a substitute module to the computing device 100 using the software module A having the weakness, and also transmits substitute module changeover demand information as a demand for changing over the software module A being used to the software module B.

The central processing unit 101 of the computer device 100 receives the software module B as substitute module and the substitute module changeover demand information by way of the network connection unit 106. Consequently, the module selection module 104 preliminarily stored in the computing device 100 changes over the software module A being executed to the software module B. To "change over" herein means that the function service being provided by the software module A is provided instead from the software module B, and specifically, the execution file for executing the operation of function service is replaced, and, for example, the function service is started again, and the cooperating relation of software modules is constructed again. The changeover demand information is, different from the changeover command for indicating the changeover, the guide information causing a changeover process to a new module. The changeover demand information does not indicate changeover, and is effective to conceal which software is weaknessive.

When the vendor completes development of software module A' as a corrected module and the software module A' is stored in the storage unit 310 (step S604), the second distribution unit 312 starts distribution of the software module A' (step S605). That is, the second distribution unit 312 transmits changeover demand information of software module A' and corrected module to the computing device 100. When the computer device 100 receives the changeover demand information of software module A' and corrected module, the module selection module 104 changes over the software module B being executed to the software module A' (steps S606, S607).

In this manner, after start of distribution of substitute module at step S603, the use of the software module having the weakness being used conventionally is prevented. Differing from distribution of the corrected module at step S503 in the prior art shown in FIG. 31, since the content of weakness correction is not contained in the substitute module distributed at step S603, the risk of disclosure of hint of weakness to the attacker can be avoided.

Start of distribution of a substitute module (step S603) follows after the point of discovery of the weakness (step S601), but the process of S603 may take place before S601. More specifically, by distributing the substitute module preliminarily to the computing device 100, in the event of a weakness, the substitute module can be used immediately, so that an emergency case can be avoided.

As described herein, according to the embodiment, the existing software module can be updated safely. Still further, in the computer device for updating in order to correct a weakness of a software module, the threat of ill-willed use of the software module is reduced, and the security is enhanced.

Fourth Embodiment

The fourth embodiment is a method of distributing an updated module selection policy so that the software module not having a weakness may obtain higher judgment than the software module having a weakness, in a function of a module selection module 104 of a computing device 100 for selecting an updatable software module executed from an updatable software module 105 to be used. When a network connection unit 106 of the computing device 100 receives a new module selection policy, a central processing unit 101 stores the new module selection policy in a module selection policy storage unit 110. The module selection module 104 selects a software module being executed by the updatable software module 105 anew according to a new module selection policy, and the selected software module is set in an execution state.

As a result, without disclosing which module contains the weakness by vulnerability, the use of the software module is stopped, and an attack by utilizing the weakness can be prevented.

In this embodiment, a software module 320 shown in FIG. 30 includes a module selection policy. The module selection policy is distributed from a software module management device 301 to computing devices 303, 304, 305 by way of a network 302. The distributed module selection policy is stored in the module selection policy storage unit 110 of the computing device 100 in FIG. 27. The new module selection policy is supposed to be set in stricter condition than the evaluation index 202 corresponding to the software module found to have a weakness at step S601. That is, supposing "100 KB" is set in the usable resource quantity 211 of the software module found to have a weakness, a new module selection policy containing the condition information of "usable resource quantity smaller than 100 KB" is distributed. The module selection module 104 updates the software module operating in the updatable software module 105 according to the new module selection policy to a new software module, then software modules other than the software modules found to have weakness are selected, and set in an execution state.

Thus, the evaluation index 202 includes the content adjusted to select software modules not containing a weakness being conventionally stored in the computer device of an old version, not one or more software modules containing a software module intended to be stopped due to a weakness.

In this embodiment, the operator performs updating by distributing the evaluation index with a limited period of use periodically or irregularly, even if a weakness is not found, and it is hard to estimate the occurrence of a weakness even by distribution of an evaluation index used in a basis of selection, so that the security of the entire system can be enhanced.

Fifth Embodiment

The fifth embodiment is similar to the third and fourth embodiments, except that the end of use of a substitute module is advised of from the server to each computing device.

As a result, the usable period of a substitute module can be suspended at an arbitrary timing, and the timing to start use of a corrected module can be selected arbitrarily while observing the situation of distribution of a corrected module and completion of an application.

Sixth Embodiment

The sixth embodiment is a method of changing the cryptographic module selecting unit so that the software module not having a weakness may be ranked higher priority than the software module having a weakness, in a function of selecting a software module to be used. As a result, while concealing the weakness is found in which software module, the use of the software module is stopped, and attack by utilizing the weakness can be prevented.

In this embodiment, the software module 320 shown in FIG. 30 includes a module selection module 104. The module selection module 104 is distributed from a server 301 to computing devices 303, 304, 305 by way of a network 302. The selection module 104 is updated by a distributed new selection module in the computing device shown in FIG. 27.

The new module selects one or plural older version modules that they are conventionally stored in the computing device and do not contain the weakness, instead of the software modules that they contain weakness.

In this embodiment, the operator performs updating by distributing the evaluation index with a limited period of use periodically or irregularly, even if a weakness is not found, and it is hard to estimate the occurrence of a weakness even by distribution of an evaluation index used in a basis of selection, so that the security of the entire system can be enhanced.

Seventh Embodiment

The seventh embodiment is a method of limiting the software modules to be updated to the software modules of a cryptographic process. The cryptographic process includes lots of algorithms for the purpose of concealing the data or assuring security by a digital signature or the like, which can be selected arbitrarily. If a certain algorithm is compromised, not having an implementing weakness of the algorithm, in particular, the security of the system can be enhanced individually in the third to sixth embodiments.

As described herein, the invention can reduce the threat of attack by ill-willed use of a weakness on the computing device not operating on a new software module yet, by using the information obtained from a new software module for correcting a weakness, which was a problem in the prior art.

In the invention, when software modules intended to have the same functions are supplied from plural vendors, if a weakness is found in a software module of a certain vendor, a software module is distributed to replace the software modules of plural vendors having the same functions. In end devices, by the selection function of the software module, a software module suited to the intended function is selected. In the fourth embodiment, the software module adjusted so that the basis of selection index may be superior to that of the existing software module is distributed. In another embodiment, an instruction for changing the standard of the selection method is distributed, and the newly distributed software module replaces the existing software module. In any embodiment, the operator or the software module developer distributes and validates the software module for correcting a weakness after an appropriate distribution period, and the substitute software module is appropriately distributed to computing devices.

The foregoing embodiments are only representative examples, and may be changed and modified easily by those skilled in the art, and the embodiments may be variously modified and changed by those skilled in the art within the scope not deviating from the principle of the invention and within the range of the claims herein.

In the foregoing embodiments, computing devices connected by a network were explained, but the invention may be also applied in distribution of software modules in a personal computer, tablet computer, notebook computer, portable digital assistant, mini computer, main frame computer, cell phone, wireless communication device, hybrid computing device combining cell phone and portable digital assistant, various types of computers, computing devices, or computing systems.

The embodiments of the invention are described herein by referring to the accompanying drawings, but the specific configurations are not limited to the illustrated embodiments, and may be designed in different configurations within a scope not departing from the true spirit of the invention.

The program for realizing the function of the processing unit of the invention may be recorded in a computer-readable recording medium, and the program recorded in the recording medium is read and executed by the computer system, and the software module may be distributed. Herein, the "computer system" includes the OS, peripheral devices, and other hardware. The computer system may also include a WWW system having a homepage presenting environment (or indication environment). The "computer-readable recording medium" includes a flexible disk, opto-magnetic disk, ROM, CD-ROM, other portable medium, or hard disk built into a computer system, or other storage device. The computer-readable recording medium also holds, in a memory such as volatile memory (RAM), a program for a certain time in a computer system such as a server or client when the program is transmitted through a communication circuit such as the Internet, other network or telephone circuit.

The program may be also transmitted from the computer system having this program stored in the storage device, to another computer system by way of a transmission medium or by transmission waves in a transmission medium. The "transmission medium" for transmitting the program is any medium having a function of transmitting the information, such as the Internet, other network (communication network), telephone circuit, or other communication network (communication line). The program may realize only part of the above function. The function may be realized by combination with the program already recorded in the computer system, and, for example, a so-called differential file (differential program) may be used.

What is claimed is:

1. A cryptographic client device for executing a cryptographic process on specified subject data, the cryptographic client device comprising:
 a storage device which stores a cryptographic key used for a cryptographic process, a cryptographic module for executing the cryptographic process, and a cryptographic evaluation description file of the cryptographic module related to the cryptographic module, the cryptographic evaluation description file including digitized information for indicating a security of a cryptographic method, a cryptographic processing speed, and a key length usable in the cryptographic process;
 a cryptographic process demand accepting device configured to accept demand information of the cryptographic process;
 a cryptographic key acquiring device configured to acquire the cryptographic key according to the demand information from the storage device on the basis of the demand information accepted in the cryptographic process demand accepting device;
 a cryptographic evaluation description file acquiring device configured to acquire the cryptographic evaluation description file corresponding to the demand information from the storage device on the basis of the demand information accepted in the cryptographic process demand accepting device;

a cryptographic process executing device configured to execute a cryptographic process on the subject data by acquiring the cryptographic module corresponding to the cryptographic evaluation description file acquired by the cryptographic evaluation description file acquiring device; and an output device configured to issue encrypted subject data generated by the cryptographic process executing device.

2. A cryptographic package distribution system comprising a cryptographic client device for executing a cryptographic process on specified subject data, and a cryptographic management server device for distributing a cryptographic package suited to the cryptographic process to the cryptographic client device, wherein the cryptographic client devices comprises:

a distribution demand information accepting device configured to accept distribution demand information of the cryptographic package; and a distribution demand information transmission device configured to transmit the distribution demand information of the distribution demand information accepting device to the cryptographic management server device, and the cryptographic management server device comprises:

a storage device which stores a cryptographic module for executing the cryptographic process, and a cryptographic evaluation description file of the cryptographic module related to the cryptographic module, the cryptographic evaluation description file including digitized information for indicating a security of a cryptographic method, a cryptographic processing speed, and a key length usable in the cryptographic process;

a distribution demand information accepting device configured to receive the distribution demand information transmitted from the distribution demand information transmission device;

a cryptographic package generation device configured to generate a cryptographic package by acquiring the cryptographic evaluation description file and the cryptographic module according to the distribution information from the storage device on the basis of the distribution demand information received by the distribution demand information accepting device, the cryptographic package including the cryptographic evaluation description file and the cryptographic module; and a cryptographic package distribution device configured to distribute the cryptographic package generated by the cryptographic package generation device to the cryptographic client device.

3. The cryptographic package distribution system according to claim 2, wherein the cryptographic client device stores the cryptographic package distributed by the cryptographic package distribution device into the storage device of the cryptographic client device by dividing the cryptographic package into a cryptographic evaluation description file and a cryptographic module.

4. A cryptographic management server device for distributing a cryptographic package suited to a specified cryptographic process to a cryptographic client device connected through a network, comprising:

a storage device which stores a cryptographic module for executing the cryptographic process, and a cryptographic evaluation description file of the cryptographic module related to the cryptographic module, the cryptographic evaluation description file including digitized information for indicating a security of a cryptographic method, a cryptographic processing speed, and a key length usable in the cryptographic process;

a distribution demand information accepting device configured to receive distribution demand information of a cryptographic package transmitted from the cryptographic client device;

a cryptographic package generation device configured to generate a cryptographic package by acquiring the cryptographic evaluation description file and the cryptographic module according to the distribution information from the storage device on the basis of the distribution demand information received by the distribution demand information accepting device, the cryptographic package including the cryptographic evaluation description file and the cryptographic module; and a cryptographic package distribution device configured to distribute the cryptographic package generated by the cryptographic package generation device to the cryptographic client device.

5. A cryptographic client device for executing a cryptographic process on specified subject data, comprising:

a storage device which stores a cryptographic key used for a cryptographic process, a cryptographic module for executing the cryptographic process, selection information describing policy information as condition information of the cryptographic module and a highest position cryptographic evaluation description identifier of a cryptographic module corresponding to the policy information, and cryptographic module link information including a cryptographic evaluation identifier of a cryptographic module, a cryptographic module identifier and a lower position cryptographic evaluation description identifier, the condition information including a cryptographic method category, a maker of the cryptographic module, and hardware information for operating the cryptographic module;

a cryptographic process demand accepting device configured to accept demand information of the cryptographic process;

a selection information acquiring device configured to acquire the selection information depending on the demand information from the storage device on the basis of the demand information accepted in the cryptographic process demand accepting device;

a cryptographic key acquiring device configured to acquire the cryptographic key according to the demand information from the storage device on the basis of the demand information accepted in the cryptographic process demand accepting device;

a cryptographic process executing device configured to execute a cryptographic process on the subject data to be performed the cryptographic process by acquiring the cryptographic module and cryptographic module link information corresponding to the selection information acquired by the selection information acquiring device; and an output device configured to issue encrypted subject data executed by the cryptographic process executing device.

6. A cryptographic container distribution system comprising a cryptographic client device for executing a cryptographic process on specified subject data, and a cryptographic management server device for distributing a cryptographic container suited to the cryptographic process to the cryptographic client device, wherein the cryptographic client device comprises:

a selection request information accepting device configured to accept selection request information of the cryptographic module for composing the cryptographic container;

a selection request information transmission device configured to transmit the selection request information accepted by the selection request information accepting device to the cryptographic management server device; and a cryptographic container generation information transmission device configured to transmit the cryptographic container generation request information for generating the cryptographic container to the cryptographic management server device; and the cryptographic management server device comprises:

a storage device which stores a cryptographic module for executing the cryptographic process, and a cryptographic evaluation description file of the cryptographic module related to the cryptographic module, the cryptographic evaluation description file including digitized information for indicating a security of a cryptographic method, a cryptographic processing speed, and a key length usable in the cryptographic process;

a receiving device configured to receive selection request information and cryptographic container generation request information transmitted from the cryptographic client device;

a cryptographic evaluation description file identifier extraction device configured to extract an identifier of a cryptographic evaluation description file of a cryptographic module corresponding to the selection request information from the storage device on the basis of the selection request information received by the receiving device;

a cryptographic container generation necessity investigation request device configured to transmit generation necessity request information of the cryptographic container to the cryptographic client device on the basis of the identifier extracted by the cryptographic evaluation description file identifier extraction device;

a cryptographic container generation device configured to generate a cryptographic container from the cryptographic evaluation description file and cryptographic module corresponding to the extracted identifier, on the basis of reply information from the cryptographic client device corresponding to the generation necessity request information transmitted from the cryptographic container generation necessity investigation request device, the cryptographic container including the cryptographic evaluation description file and the cryptographic module; and a cryptographic container distribution device configured to distribute the cryptographic container generated by the cryptographic container generation device to the cryptographic client device.

7. The cryptographic container distribution system according to claim 6, wherein the cryptographic client device stores the cryptographic container distributed by the cryptographic container distribution device in the storage device of the cryptographic client device by dividing the cryptographic container into a cryptographic evaluation description file and a cryptographic module.

8. A cryptographic management server device for distributing a cryptographic container suited to a specified cryptographic process to a cryptographic client device connected through a network, comprising:

a storage device which stores a cryptographic module for executing the cryptographic process, and a cryptographic evaluation description file of the cryptographic module related to the cryptographic module, the cryptographic evaluation description file including digitized information for indicating a security of a cryptographic method, a cryptographic processing speed, and a key length usable in the cryptographic process;

a receiving device configured to receive selection request information and cryptographic container generation request information for composing the cryptographic container transmitted from the cryptographic client device;

a cryptographic evaluation description file identifier extraction device configured to extract an identifier of a cryptographic evaluation description file of a cryptographic module corresponding to the selection request information from the storage device on the basis of the selection request information received by the receiving device;

a cryptographic container generation necessity investigation request device configured to transmit generation necessity request information of the cryptographic container to the cryptographic client device on the basis of the identifier extracted by the cryptographic evaluation description file identifier extraction device;

a cryptographic container generation device configured to generate a cryptographic container from the cryptographic evaluation description file and cryptographic module corresponding to the extracted identifier, on the basis of reply information from the cryptographic client device corresponding to the generation necessity request information transmitted from the cryptographic container generation necessity investigation request device, the cryptographic container including the cryptographic evaluation description file and the cryptographic module; and a cryptographic container distribution device configured to distribute the cryptographic container generated by the cryptographic container generation device to the cryptographic client device.

9. A software module management device for managing software modules when changing a first software module operating in a terminal device to a second software module, comprising:

a storage device which stores a third software module different from the first software module and second software module, the third software module being a substitute module having a same function as the first software module, but implementing a different algorithm;

a first distribution device which reads out the third software module stored in the storage device, distributes the third software module to the terminal device, and performs changeover from the first software module to the third software module to set the terminal device in a usable state; and a second distribution device which distributes the second software module to the terminal device, and performs changeover from the third software module to the second software module to set the terminal device in a usable state, the second software module being a corrected module of the first software module, wherein the second distribution device terminates the use of the third software module after distribution of the second software module.

10. The software module management device according to claim 9, wherein the first to third software modules have functions of executing a cryptographic process.

11. A software module management device for managing the software modules when changing a first software module operating in a terminal device to a second software module, comprising:
- a storage device which stores at least one software module, the storage device storing a third software module being a substitute module having a same function as the first software module, but implementing a different algorithm;
- a first distribution device configured to read out the third software module stored in the storage device, and distribute the third software module to the terminal device; and
- a second distribution device configured to distribute the second software module to the terminal device, and perform changeover from the third software module to the second software module to set the terminal device in a usable state, the second software module being a corrected module of the first software module,
- wherein the second distribution device terminates the use of the third software module being used after the first software module after distribution of the second software module.

12. The software module management device according to claim 11, wherein the first to third software modules have functions of executing a cryptographic process.

13. A software module management device for managing software modules when changing a first software module operating in a terminal device to a second software module, comprising:
- a first storage device for storing at least one software module, including an evaluation index of the software module, the evaluation index including at least one of a quantity of usable resources, processing speed, processing content, application, and period of use;
- a second storage device which stores basis of selection information showing a standard for selecting the software module;
- a software module selection urging device configured to select a software module stored in the first storage device, based on the evaluation index satisfying the basis of selection information;
- a first distribution device configured to read out the software module selected by the software module selection urging device from the first storage device, and distribute the software module to the terminal device; and
- a second distribution device configured to distribute the second software module to the terminal device, and perform changeover from the selected software module to the second software module to set the terminal device in usable state.

14. The software module management device according to claim 13, wherein the second distribution device terminates the use of the software module being used after the first software module after distribution of the second software module.

15. The software module management device according to claim 13, wherein the first to third software modules have functions of executing a cryptographic process.

16. A software module management device for managing the software modules when changing a first software module operating in a terminal device to a second software module, comprising:
- a storage device for storing basis of selection information showing the standard for selecting the software module, the software module including an evaluation index of the software module, the evaluation index including at least one of a quantity of usable resources, processing speed, processing content, application, and period of use;
- a first distribution device configured to read out the basis of selection information stored in the storage device, and distribute the basis of selection information to the terminal device, and select the software module based on the evaluation index satisfying the basis of selection information; and
- a second distribution device configured to distribute the second software module to the terminal device, and perform changeover from the software module selected according to the basis of selection information to the second software module to set the terminal device in a usable state.

17. A non-transitory computer-readable recording medium storing a program used in a software module management device for managing the software modules when changing a first software module operating in a terminal device to a second software module, and having a storage device, comprising:
- a program code for controlling the software module management device to execute sequentially a process of storing a third software module different from the first software module and second software module, the third software module being a substitute module having a same function as the first software module, but implementing a different algorithm;
- a program code for controlling the software module management device to execute sequentially a first distribution process of reading out the third software module stored in the storage device, distributing this third software module to the terminal device, and performing changeover from the first software module to the third software module to set the terminal device in a usable state; and
- a program code for controlling the software module management device to execute sequentially a second distribution process of distributing the second software module to the terminal device, and perform changeover from the third software module to the second software module to set the terminal device in a usable state, the second software module being a corrected module of the first software module,
- wherein the second distribution process terminates the use of the third software module after distribution of the second software module.

18. A non-transitory computer-readable recording medium storing a program used in a software module management device for managing the software modules when changing a first software module operating in a terminal device to a second software module, and having a storage device, comprising:
- a program code for controlling the software module management device to execute sequentially a process of storing at least one software module in the storage device, the storage device storing a third software module being a substitute module having a same function as the first software module, but implementing a different algorithm;
- a program code for controlling the software module management device to execute sequentially a first distribution process of reading out the third software module stored in the storage device from the storage device, and distributing the third software module to the terminal device; and a program code for controlling the software module management device to execute sequentially a second distribution process of distributing the second software module to the terminal device, and performing changeover from the third software module to the second software module to set the terminal device in a usable state, the second software module being a corrected module of the first software module, wherein the second distribution process terminates the use of the third software module being used after the first software module after distribution of the second software module.

19. A non-transitory computer-readable recording medium storing a program used in a software module management device for managing the software modules when changing a first software module operating in a terminal device to a second software module, and having a first storage device and a second storage device, comprising:

a program code for controlling the software module management device to execute sequentially a process of storing at least one software module in the first storage device, the software module including an evaluation index of the software module, the evaluation index including at least one of quantity of usable resources, processing speed, processing content, application, and period of use;

a program code for controlling the software module management device to execute sequentially a software module selection urging process of selecting a software module stored in the first storage device based on the evaluation index satisfying the basis of the selection information;

a program code for controlling the software module management device to execute sequentially a first distribution process of reading out the software module selected by the software module selection urging function from the first storage device, and distributing the software module to the terminal device; and a program code for controlling the software module management device to execute sequentially a second distribution process of distributing the second software module to the terminal device, and performing changeover from the selected software module to the second software module to set the terminal device in a usable state.

20. A non-transitory computer-readable recording medium storing a program used in a software module management device for managing the software modules when changing a first software module operating in a terminal device to a second software module, and having a storage device, comprising:

a program code for controlling the software module management device to execute sequentially a process of storing basis of selection information showing the standard for selecting the software module in the storage device, the software module including an evaluation index of the software module, the evaluation index including at least one of a quantity of usable resources, processing speed, processing content, application, and period of use;

a program code for controlling the software module management device to execute sequentially a first distribution process of reading out the basis of selection information stored in the storage device, and distributing the basis of selection information to the terminal device, and selecting the software module according to the evaluation index satisfying the basis of selection information; and a program code for controlling the software module management device to execute sequentially a second distribution process of distributing the second software module to the terminal device, and perform changeover from the software module selected according to the basis of selection information to the second software module to set the terminal device in a usable state.

* * * * *